US012759148B2

(12) United States Patent
Saegusa et al.

(10) Patent No.: US 12,759,148 B2
(45) Date of Patent: Oct. 13, 2026

(54) ROBOT TEACHING METHOD AND DEVICE

(71) Applicant: Hitachi High-Tech Corporation, Tokyo (JP)

(72) Inventors: Takashi Saegusa, Tokyo (JP); Masahiro Koyama, Tokyo (JP); Tomohiro Inoue, Tokyo (JP); Hiroki Takahashi, Tokyo (JP); Shinichi Ishikawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 137 days.

(21) Appl. No.: 18/849,852

(22) PCT Filed: Apr. 22, 2022

(86) PCT No.: PCT/JP2022/018523
§ 371 (c)(1),
(2) Date: Sep. 23, 2024

(87) PCT Pub. No.: WO2023/203747
PCT Pub. Date: Oct. 26, 2023

(65) Prior Publication Data

US 2025/0214237 A1 Jul. 3, 2025

(51) Int. Cl.
*B25J 9/16* (2006.01)
*B25J 9/00* (2006.01)
(Continued)

(52) U.S. Cl.
CPC ........... *B25J 9/1664* (2013.01); *B25J 9/0081* (2013.01); *B25J 9/1697* (2013.01); *G05B 19/423* (2013.01);
(Continued)

(58) Field of Classification Search
CPC ........ B25J 9/0081; B25J 9/163; B25J 9/1656; B25J 9/1664; B25J 9/1697; B25J 9/1612;
(Continued)

(56) References Cited

U.S. PATENT DOCUMENTS

| | | | |
|---|---|---|---|
| 9,321,176 | B1 | 4/2016 | Sun et al. |
| 11,413,748 | B2 | 8/2022 | Colasanto et al. |

(Continued)

FOREIGN PATENT DOCUMENTS

| | | | |
|---|---|---|---|
| DE | 11 2016 006 116 | T5 | 9/2018 |
| DE | 10 2020 124 285 | A1 | 3/2021 |

(Continued)

OTHER PUBLICATIONS

T. Welschehold, C. Dornhege and W. Burgard, "Learning manipulation actions from human demonstrations," 2016 IEEE/RSJ International Conference on Intelligent Robots and Systems (IROS), Daejeon, Korea (South), 2016 (Year: 2016).*

(Continued)

*Primary Examiner* — Jonathan L Sample
*Assistant Examiner* — James Miller Watts, III
(74) *Attorney, Agent, or Firm* — Crowell & Moring LLP

(57) ABSTRACT

A robot teaching method allows even a person without knowledge on robots to intuitively and efficiently teach a robot a work motion by a work demonstration while maintaining a normal human motion as much as possible, and reduces man-hours for pre-adjustment of teaching, facilitate the introduction, etc. by generating a motion of a robotic hand mechanism corresponding to a work motion including an operation on an operation object by a hand of a teacher. The method includes acquiring a first measured pose obtained by measuring a pose of the operation object and a second measured pose obtained by measuring a pose of the hand of the teacher during the work motion; detecting the
(Continued)

operation on the operation object by the teacher; and generating a teaching pose for generating the robotic motion data based on the first measured pose, the second measured pose, and the detected operation.

13 Claims, 20 Drawing Sheets

(51) Int. Cl.
*G05B 19/423* (2006.01)
*G06T 7/70* (2017.01)

(52) U.S. Cl.
CPC ...... *G06T 7/70* (2017.01); *G06T 2207/30196* (2013.01); *G06T 2207/30204* (2013.01)

(58) Field of Classification Search
CPC .. B25J 13/08; B25J 3/00; G05B 19/42; G05B 19/423; G05B 2219/40391; G05B 2219/35444; G05B 2219/36442; G05B 2219/39451; G05B 2219/39546; G05B 2219/39122; G06T 2207/30196; G06T 2207/30204; G06T 7/70; G06T 1/0014; G06T 2207/20081; G06V 2201/06
See application file for complete search history.

(56) References Cited

U.S. PATENT DOCUMENTS

| | | | | |
|---|---|---|---|---|
| 2018/0046152 | A1* | 2/2018 | Fujita | G05B 19/402 |
| 2018/0345491 | A1 | 12/2018 | Iwamoto | |
| 2021/0316449 | A1 | 10/2021 | Wang et al. | |
| 2022/0203517 | A1* | 6/2022 | Iwahara | B25J 9/1697 |
| 2023/0120598 | A1* | 4/2023 | Wang | B25J 13/003 700/264 |
| 2023/0278211 | A1 | 9/2023 | Koyama et al. | |
| 2024/0293941 | A1* | 9/2024 | Shuo | B25J 9/0081 |

FOREIGN PATENT DOCUMENTS

| | | | | |
|---|---|---|---|---|
| DE | 11 2018 002 565 | B4 | | 7/2021 |
| JP | 2001-51712 | A | | 2/2001 |
| JP | 2015-71206 | A | | 4/2015 |
| JP | 2015071206 | A | * | 4/2015 |
| JP | 2021-167060 | A | | 10/2021 |
| WO | WO 2017/130389 | A1 | | 8/2017 |
| WO | WO 2019/064751 | A1 | | 4/2019 |
| WO | WO 2021/260898 | A1 | | 12/2021 |

OTHER PUBLICATIONS

O. Kedilioglu, T. M. Bocco, M. Landesberger, A. Rizzo and J. Franke, "ArUcoE: Enhanced ArUco Marker," 2021 21st International Conference on Control, Automation and Systems (ICCAS), Jeju, Korea, Republic of, 2021, pp. 878-881, doi: 10.23919/ICCAS52745.2021.9650050 (Year: 2021).*
Translation of JP-2015071206-A (Year: 2015).*
International Search Report (PCT/ISA/210) issued in PCT Application No. PCT/JP2022/018523 dated Jul. 12, 2022 with English translation (5 pages).
Japanese-language Written Opinion (PCT/ISA/237) issued in PCT Application No. PCT/JP2022/018523 dated Jul. 12, 2022 with English translation (5 pages).
German-language Office Action issued in German Application No. 11 2022 006 521.4 dated Oct. 21, 2025 with partial English translation (7 pages).

* cited by examiner

[FIG. 1]
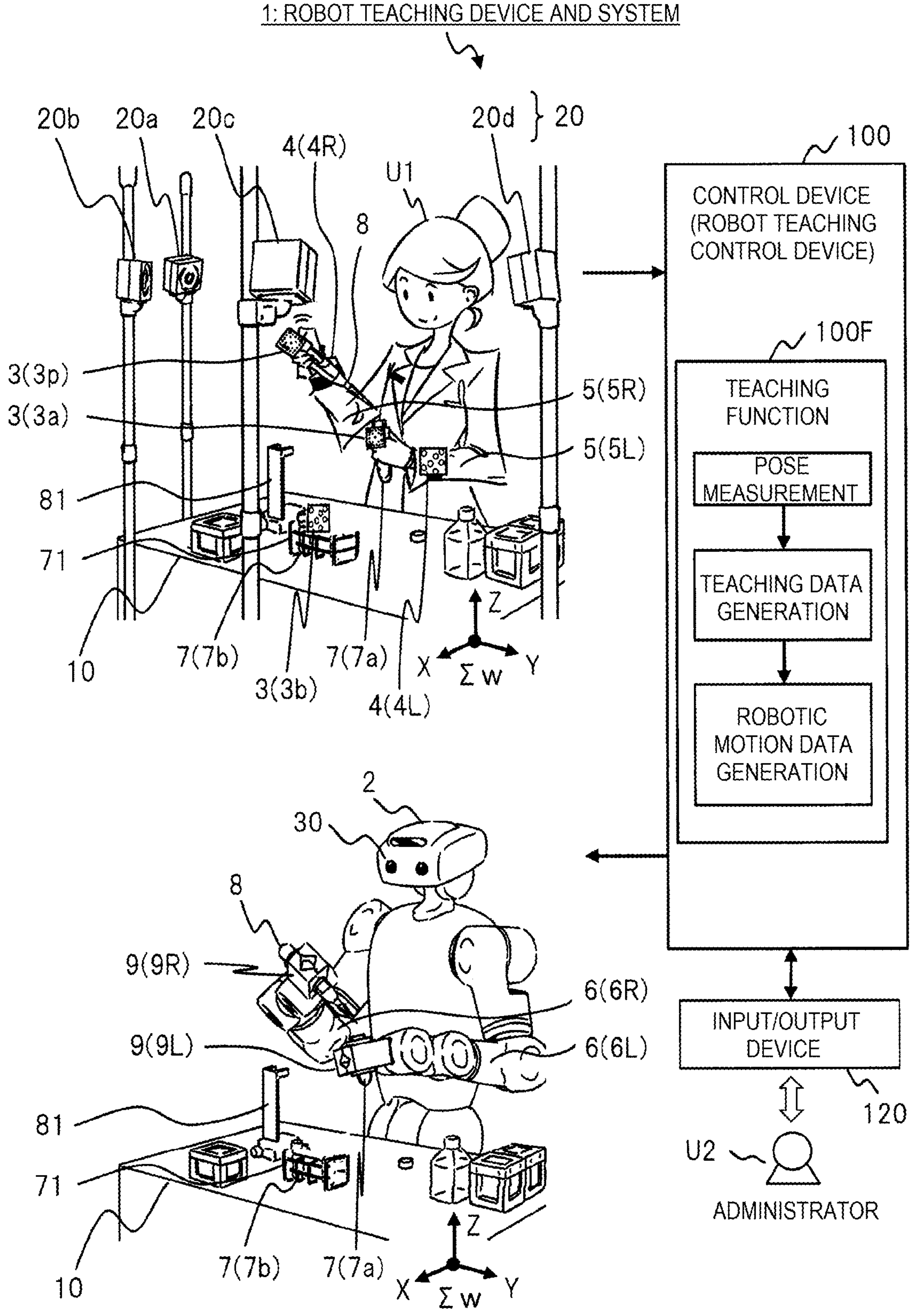

[FIG. 2]
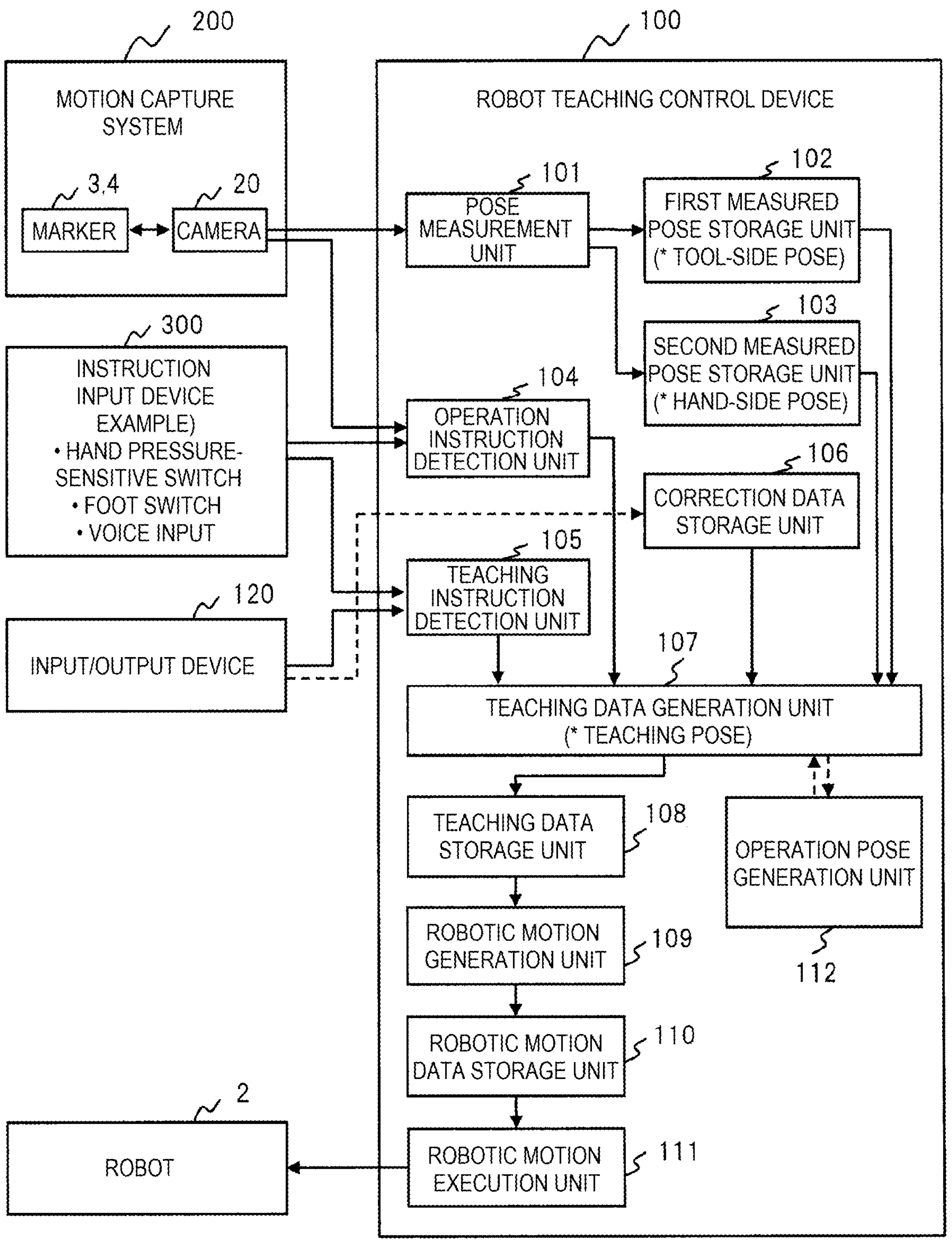

[FIG. 3]
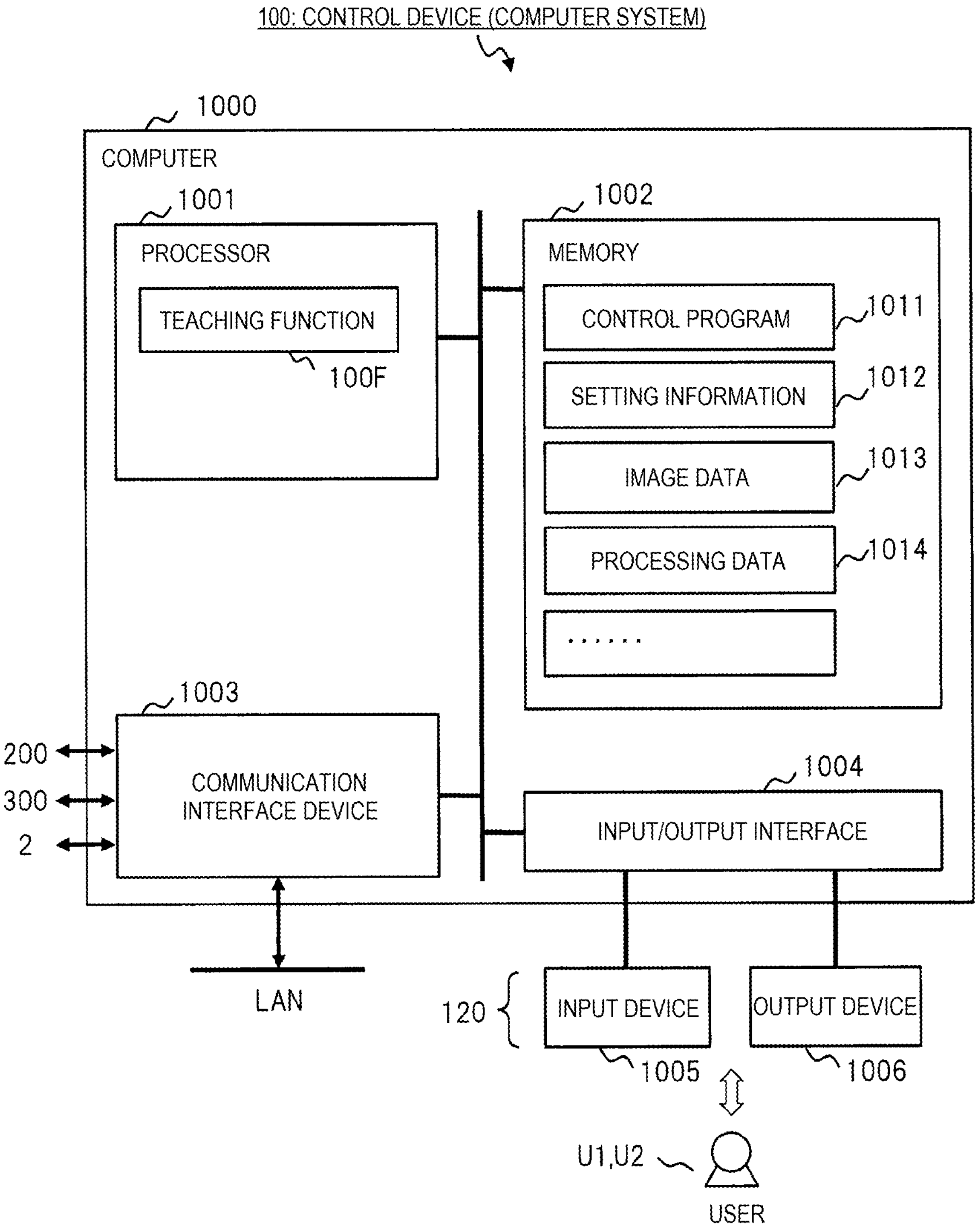

[FIG. 4]
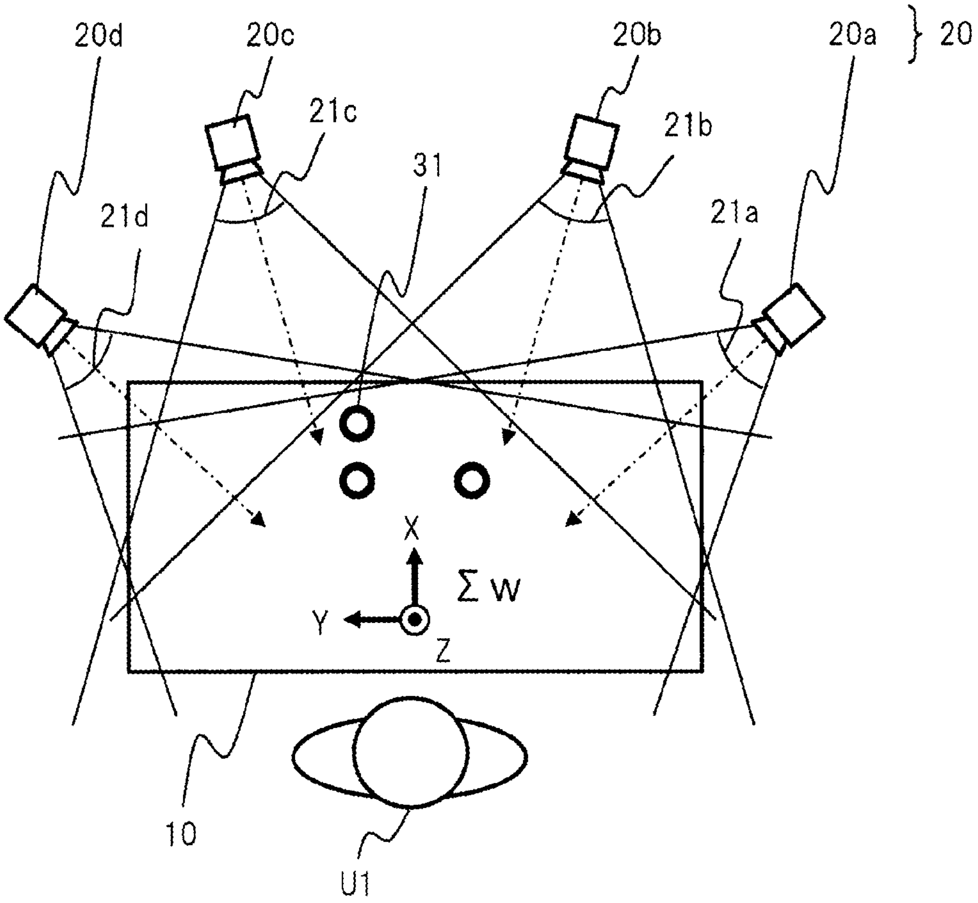
[FIG. 5]
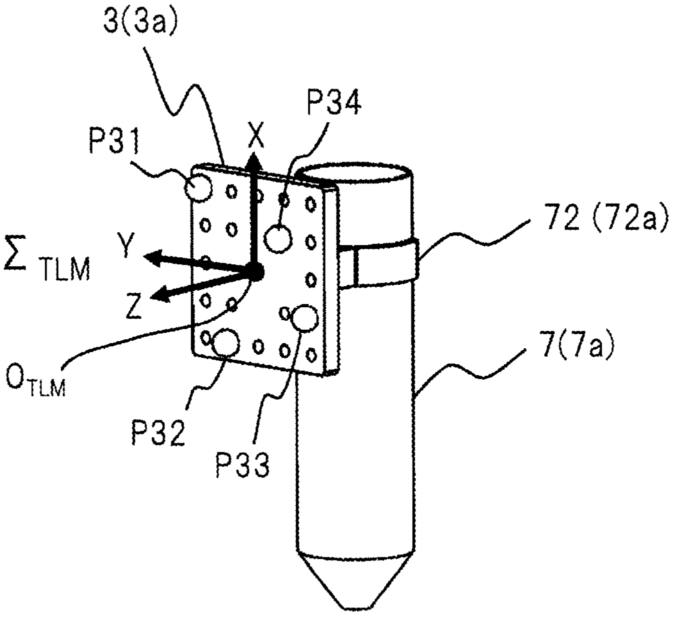

[FIG. 6]
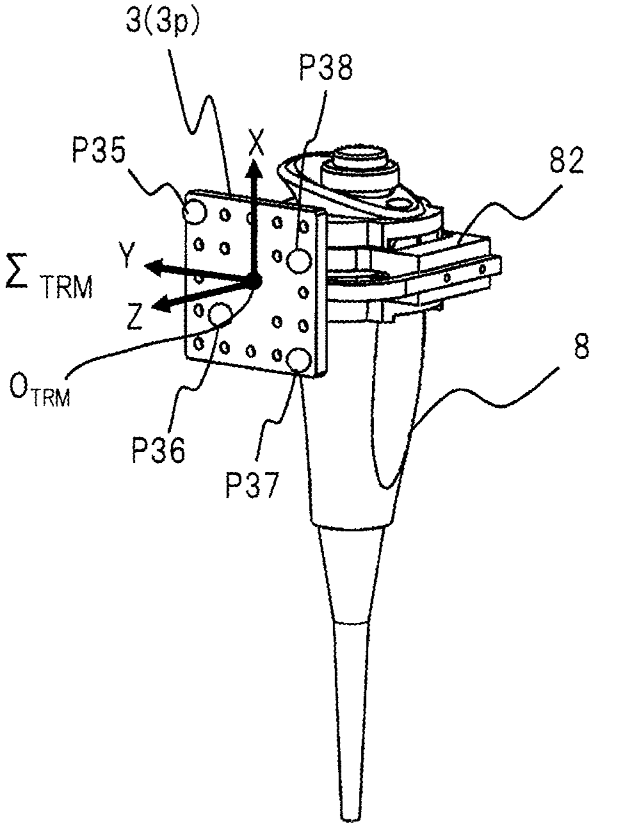
[FIG. 7A]
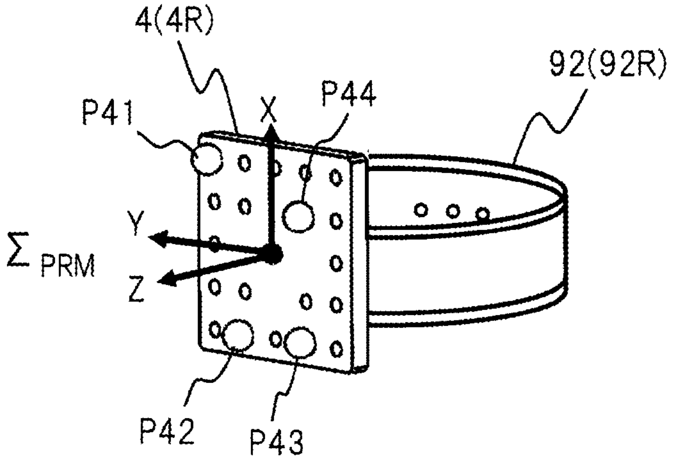

[FIG. 7B]
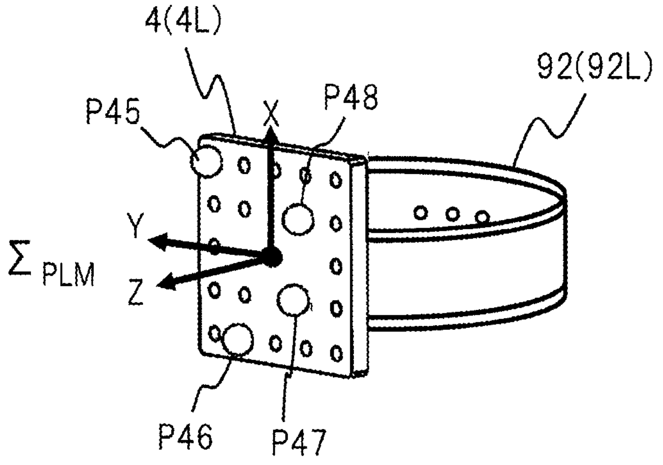
[FIG. 8]
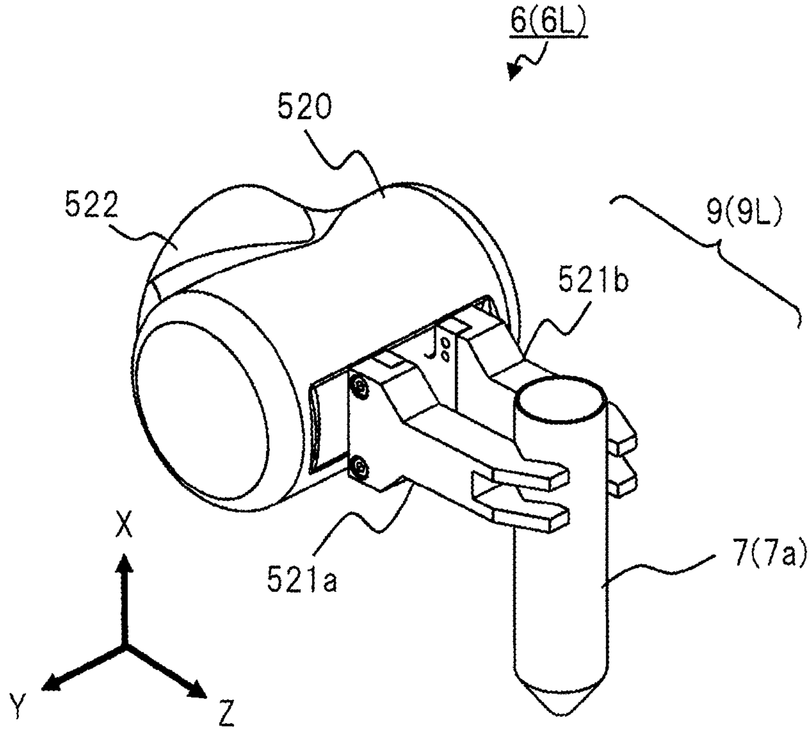

[FIG. 9A]
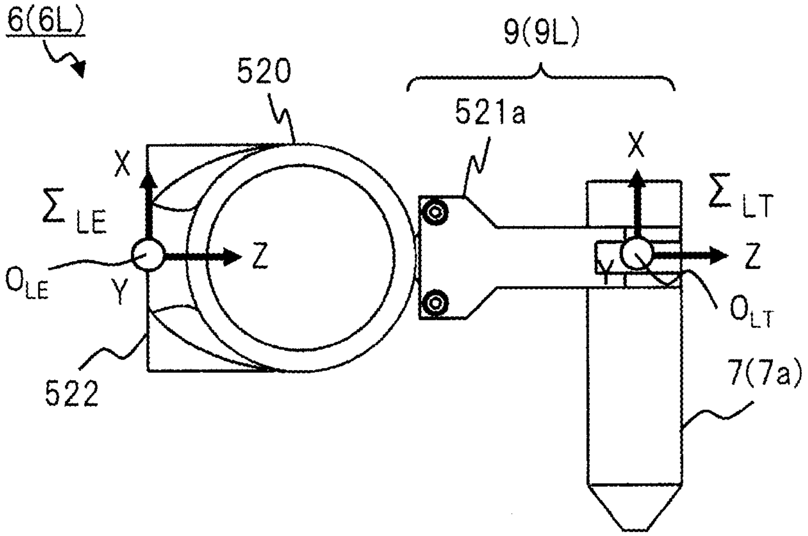
[FIG. 9B]
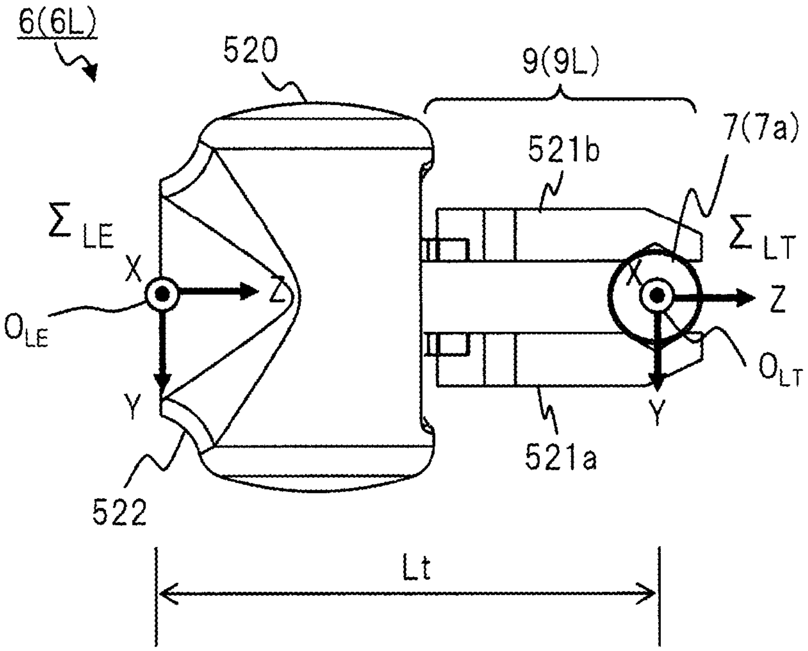

[FIG. 10]
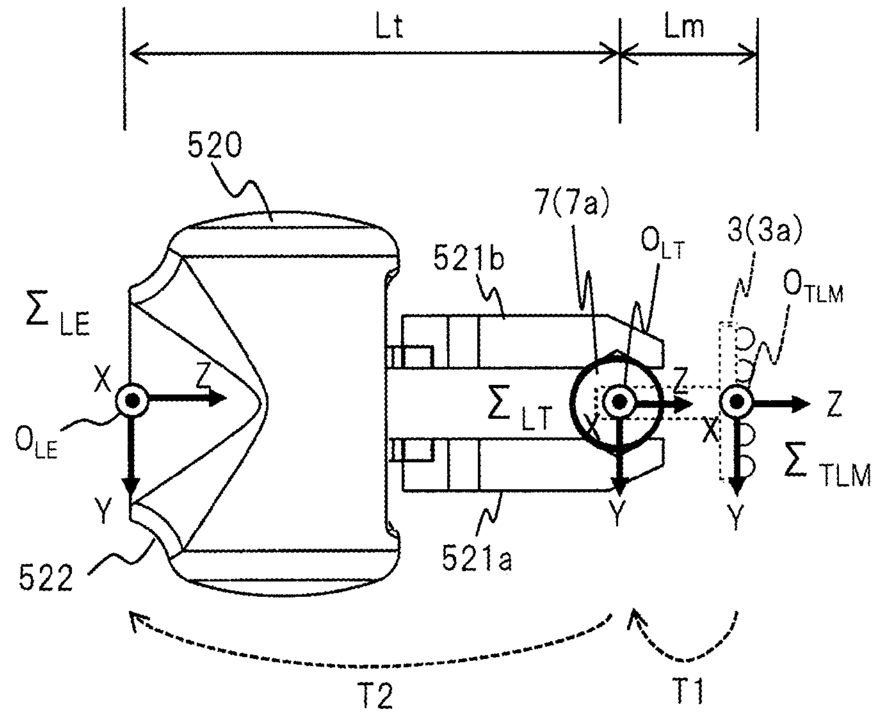
[FIG. 11]
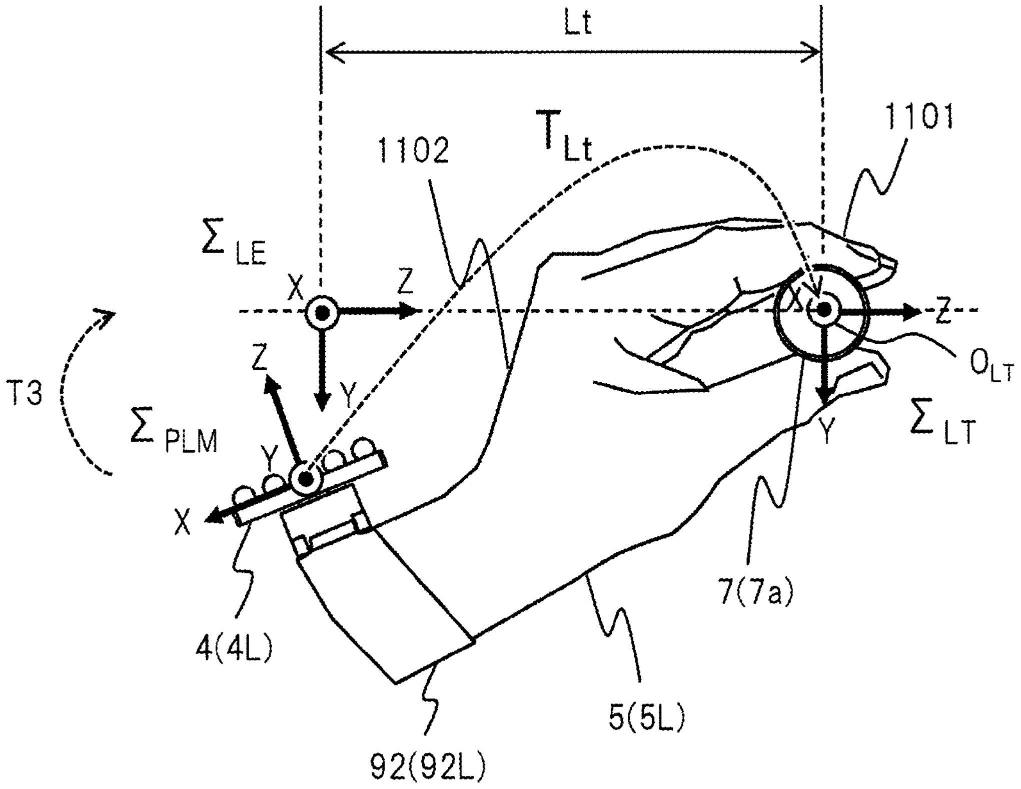

[FIG. 12]
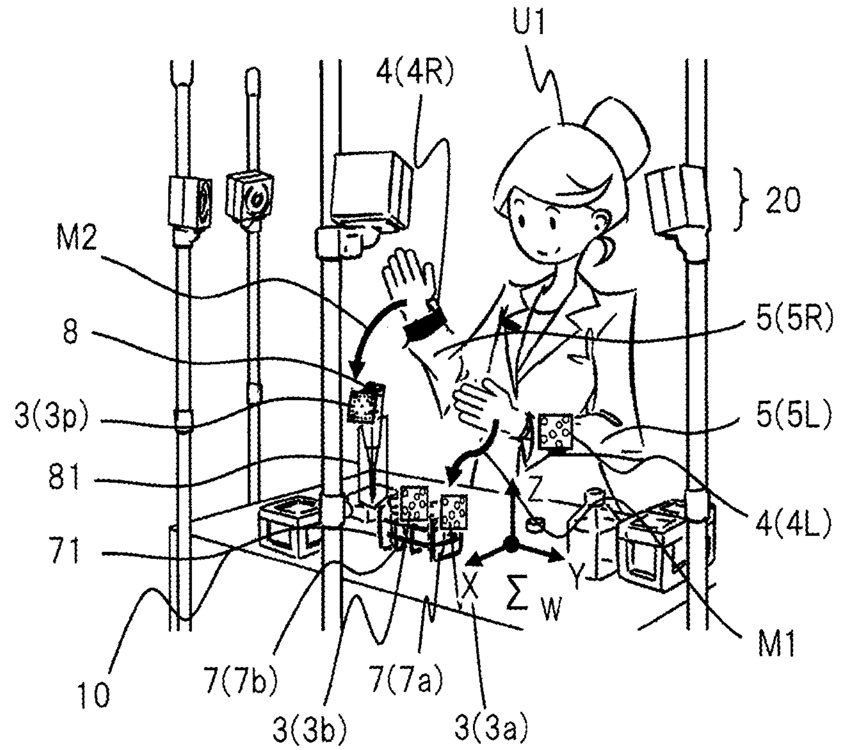
[FIG. 13]
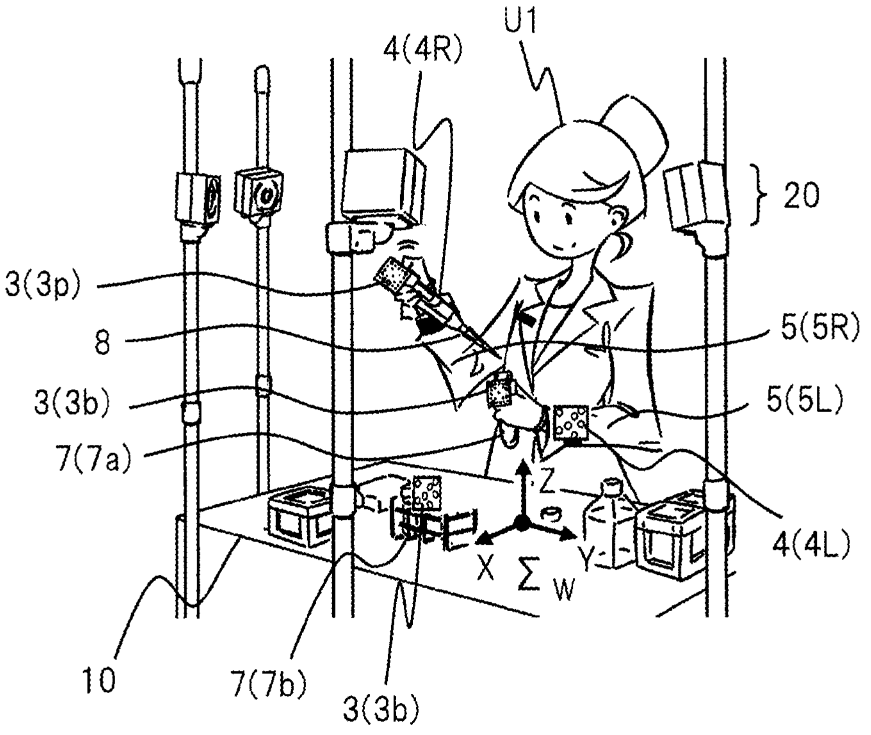

[FIG. 14]
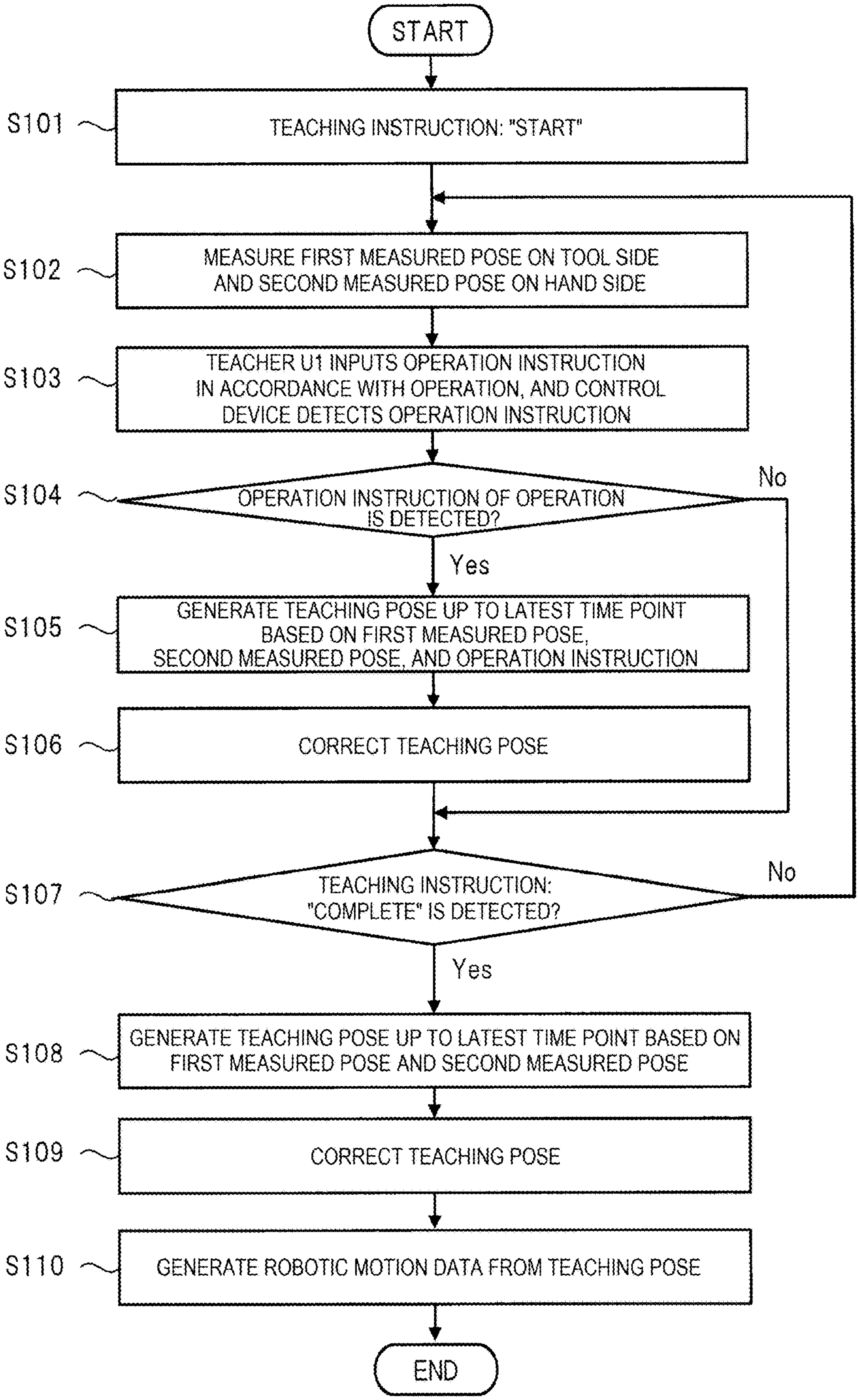

[FIG. 15A]
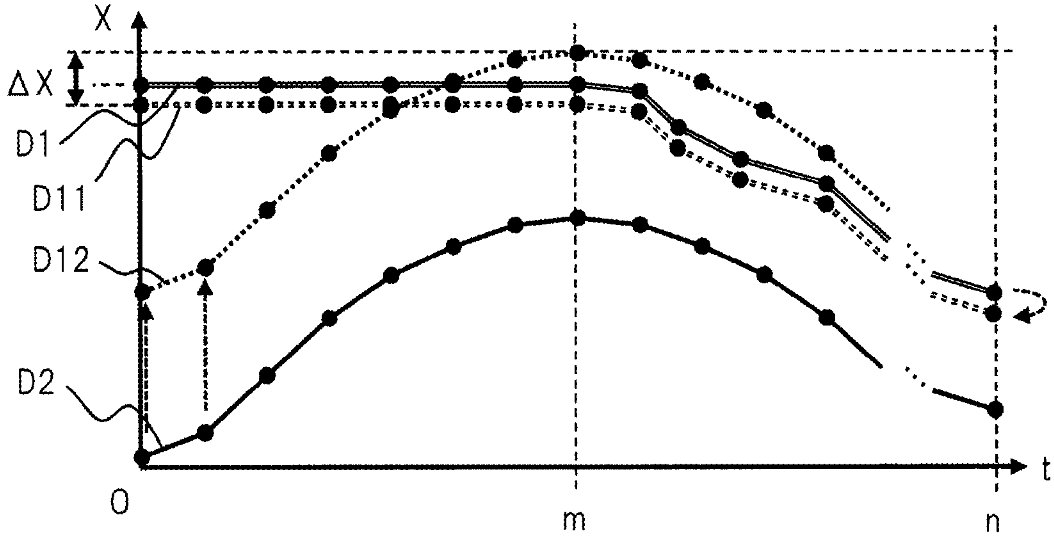
[FIG. 15B]
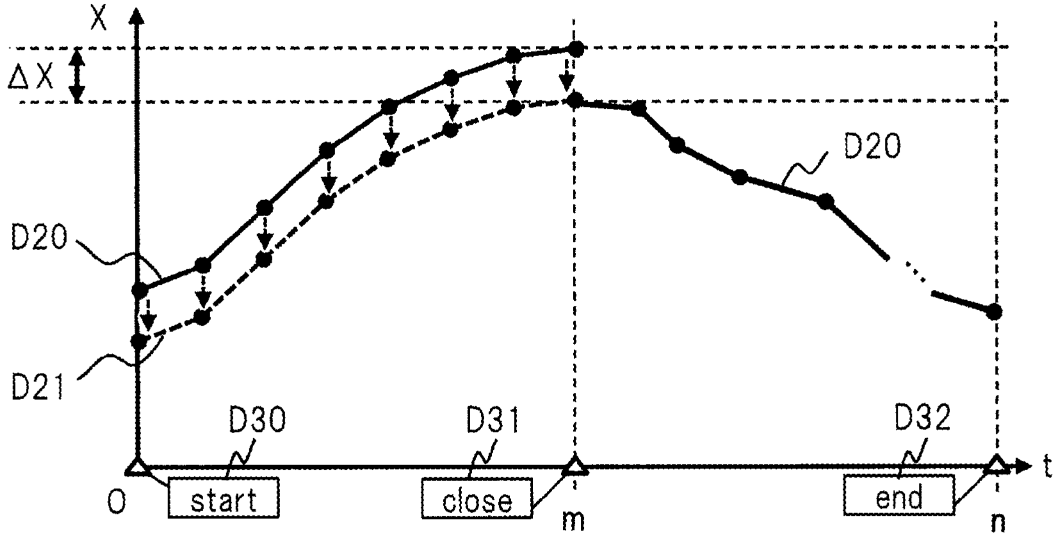

[FIG. 15C]
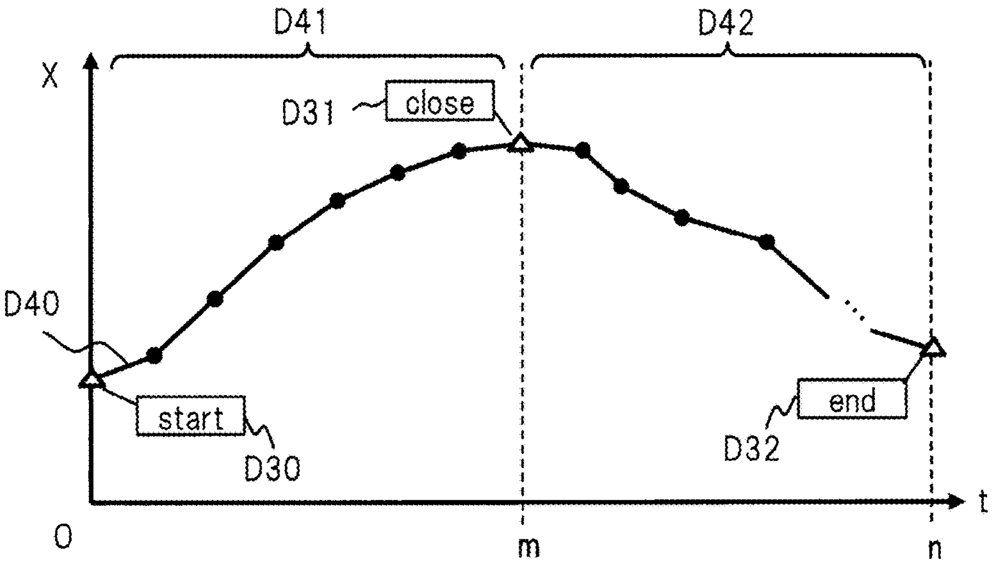
[FIG. 16A]
MODIFICATION 1A
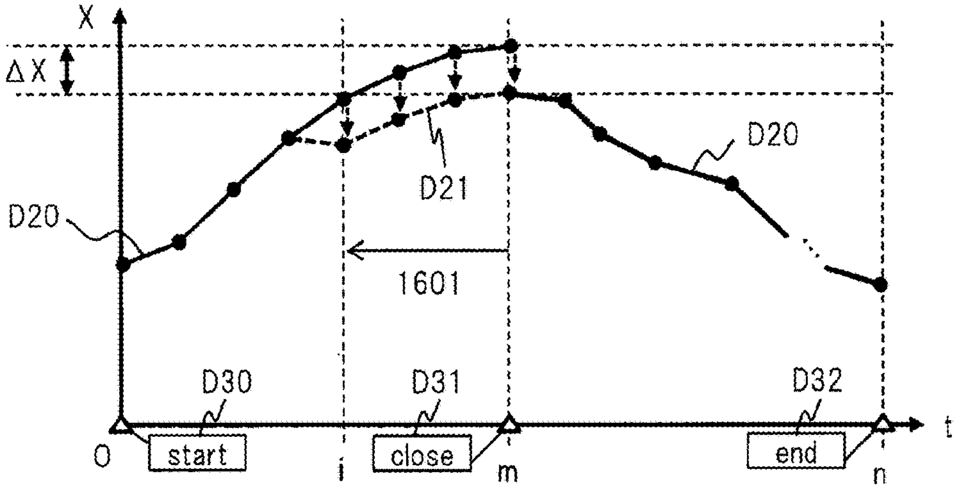

[FIG. 16B]
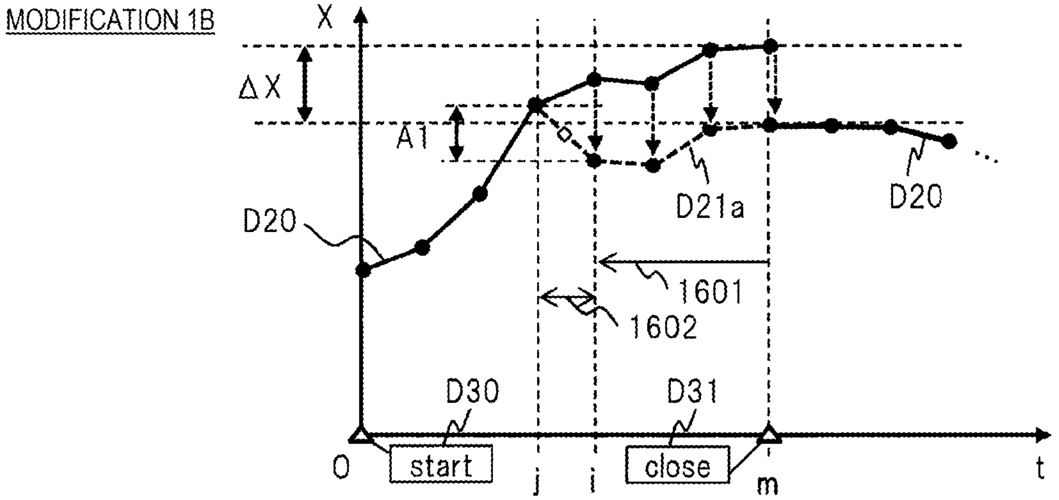
[FIG. 16C]
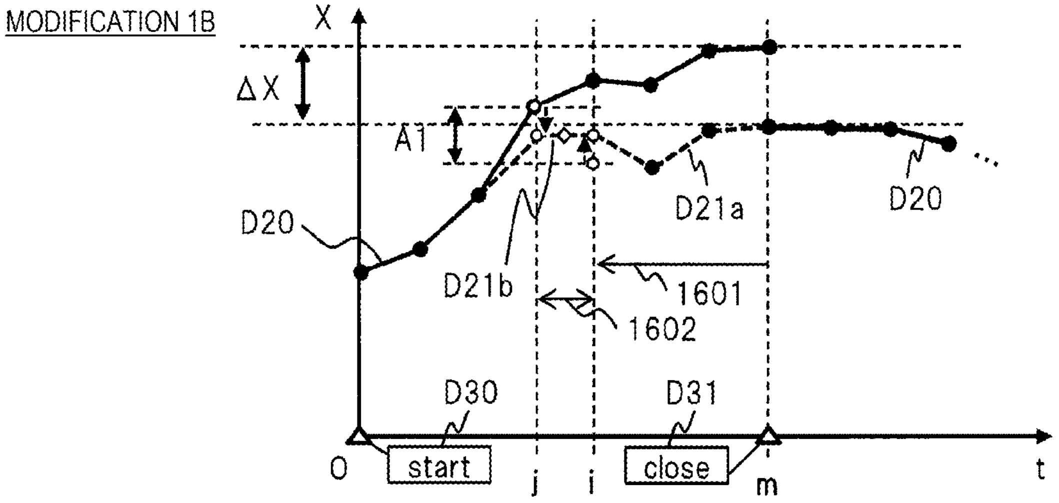

[FIG. 17A]
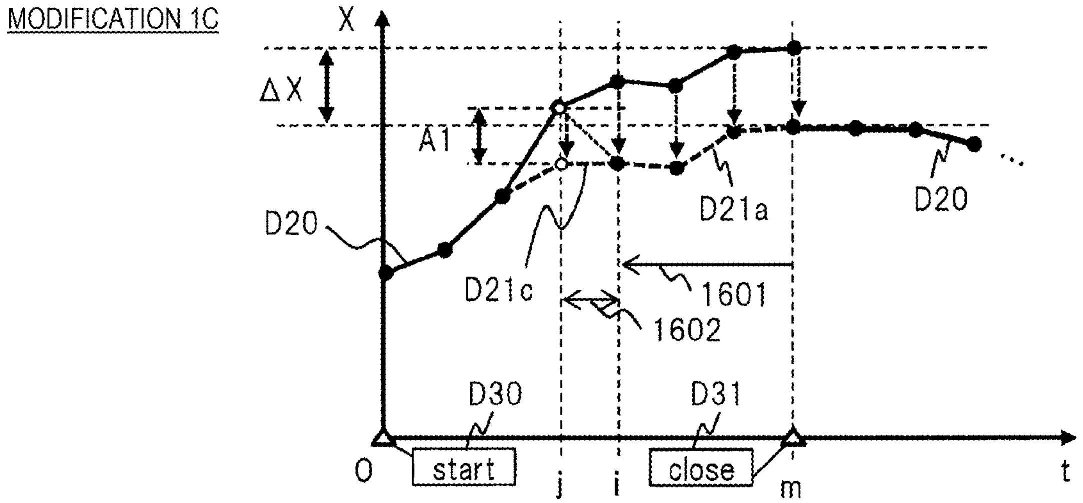
[FIG. 17B]
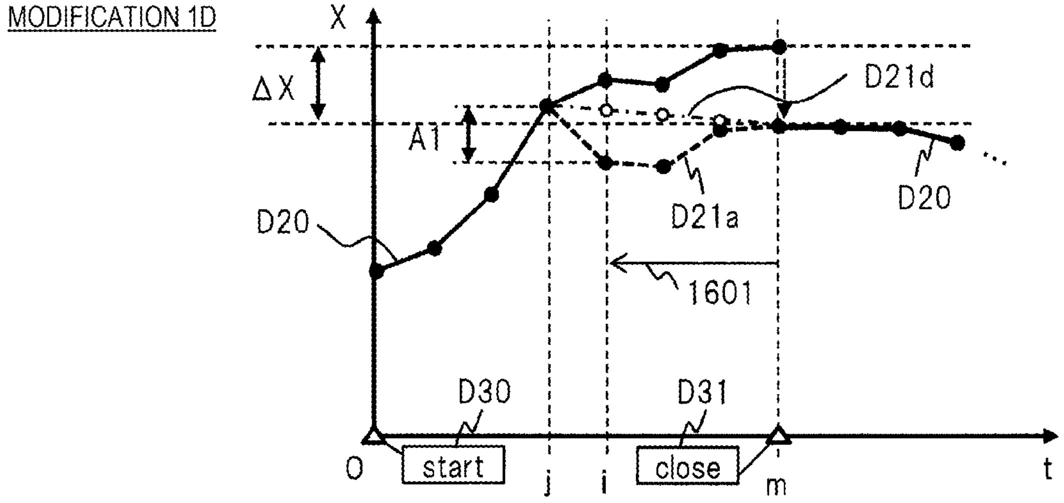

[FIG. 18]
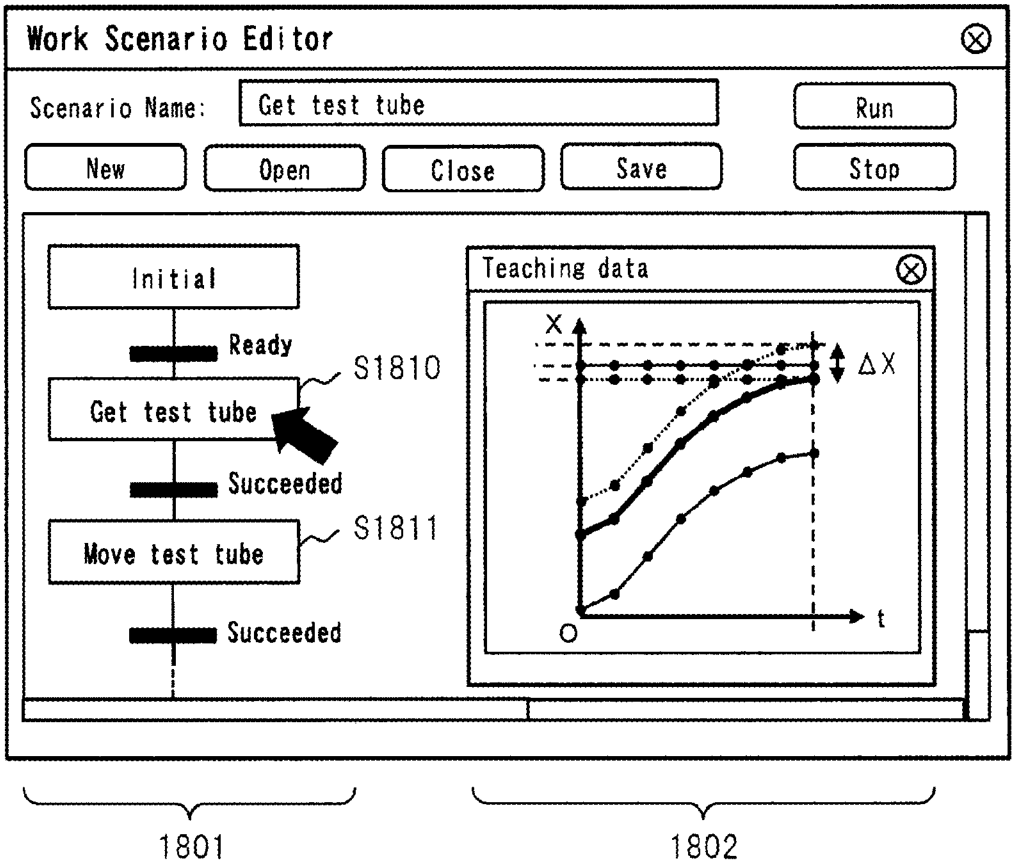

[FIG. 19]
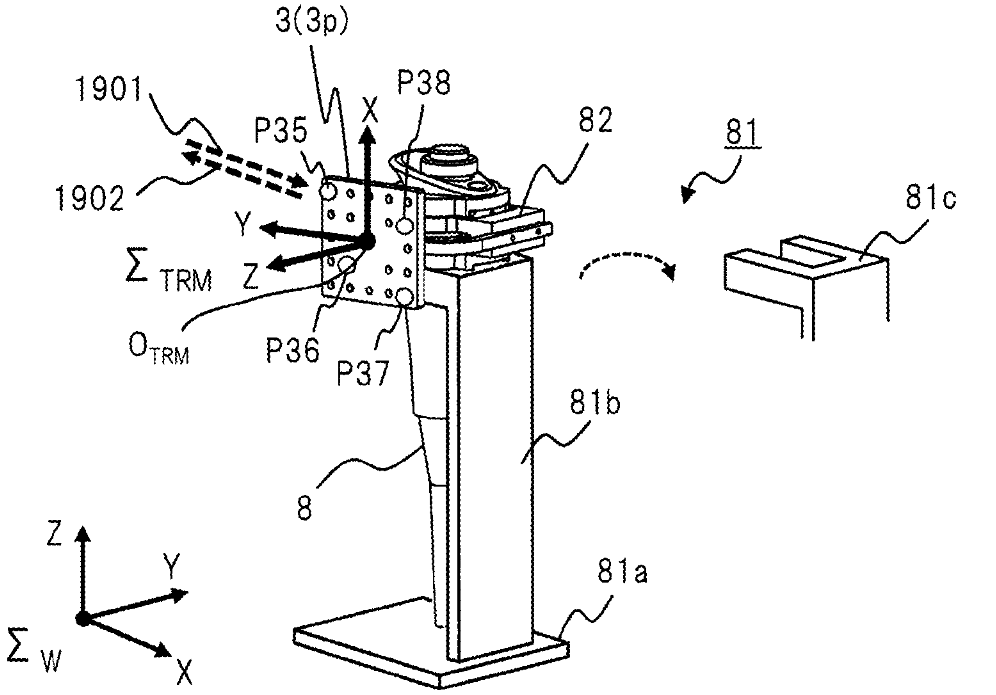
[FIG. 20]
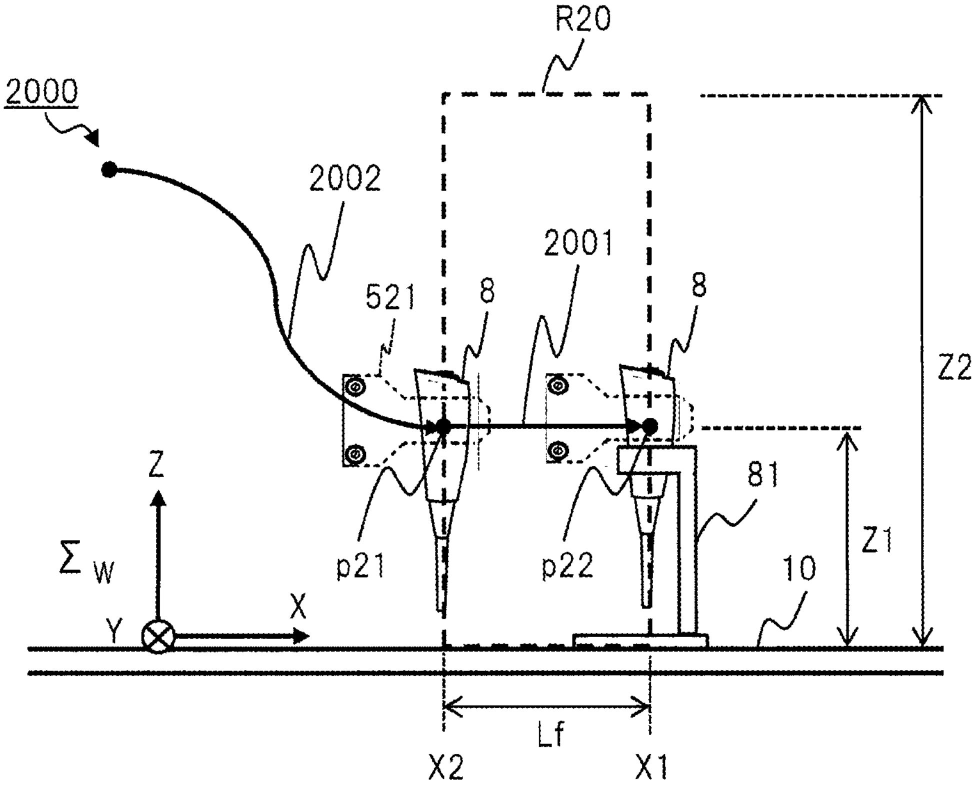

[FIG. 21A]
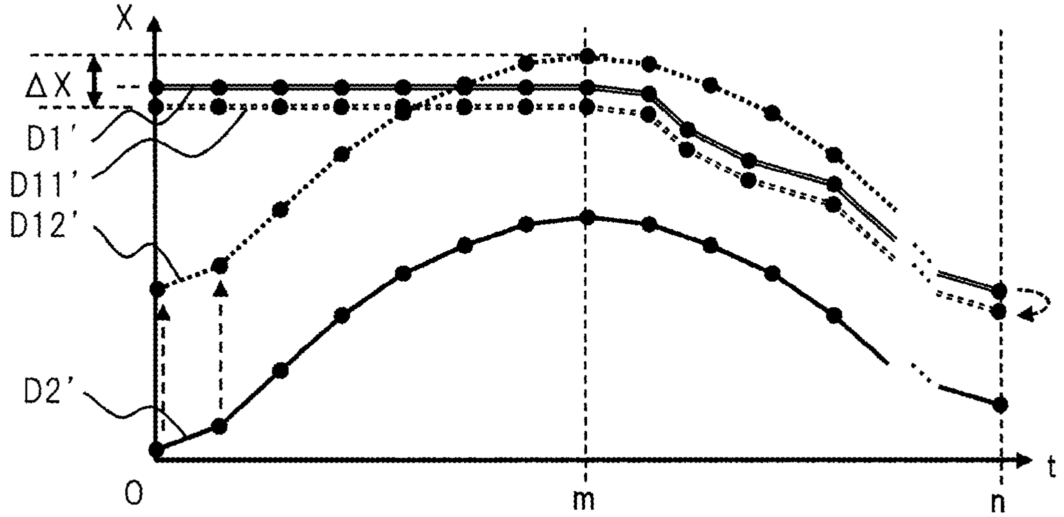
[FIG. 21B]
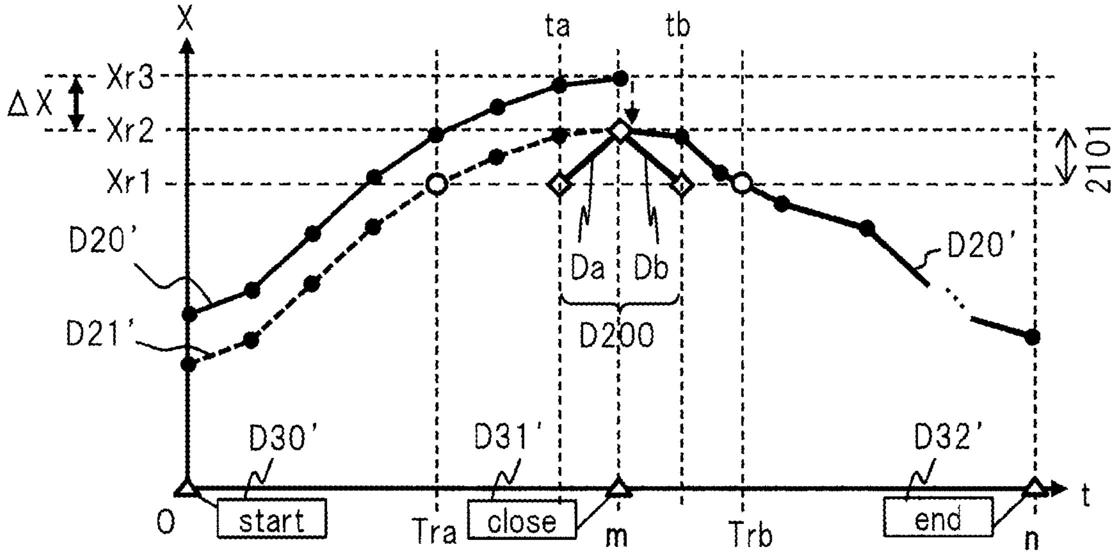

[FIG. 21C]
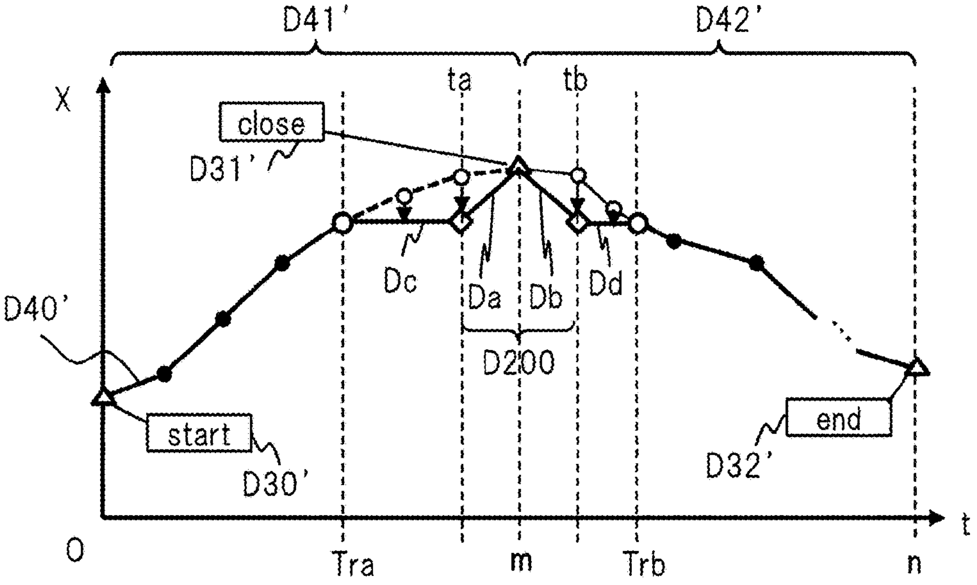
[FIG. 22A]
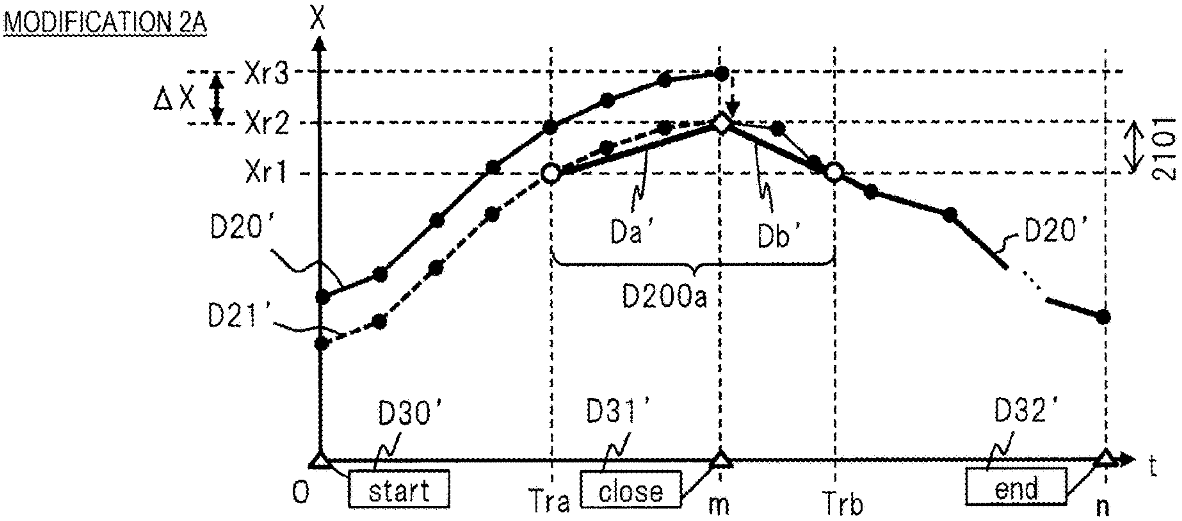

[FIG. 22B]
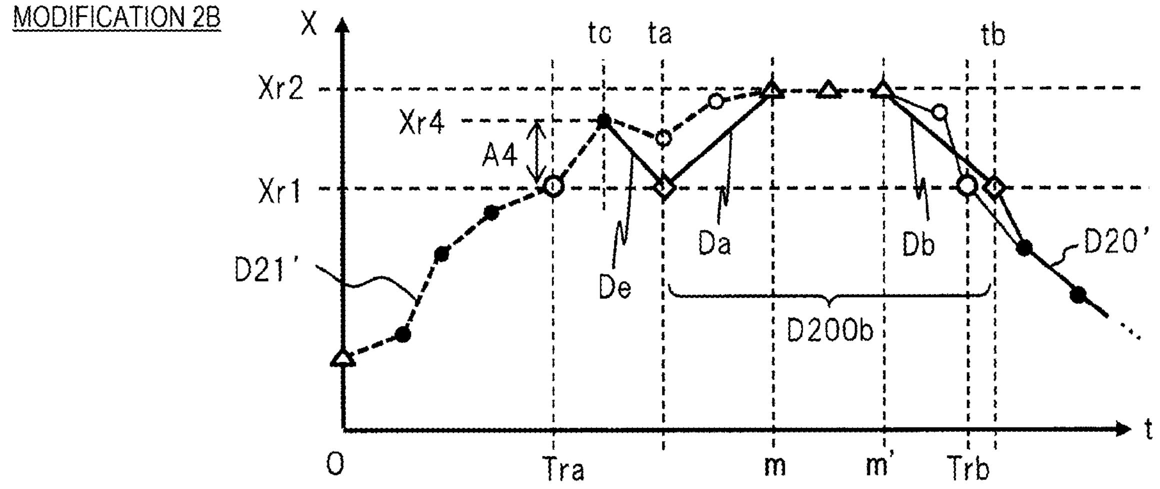
[FIG. 22C]
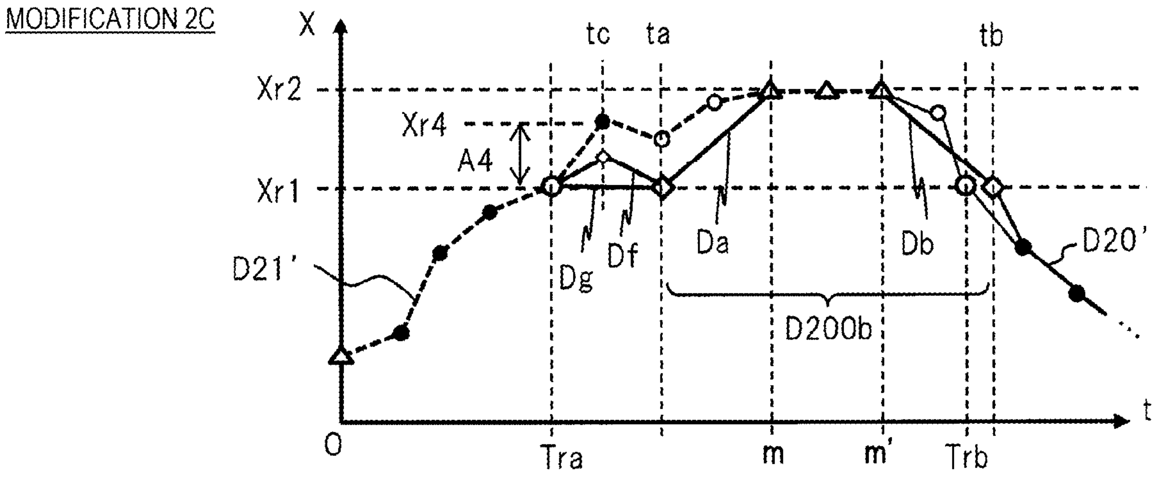

[FIG. 23]
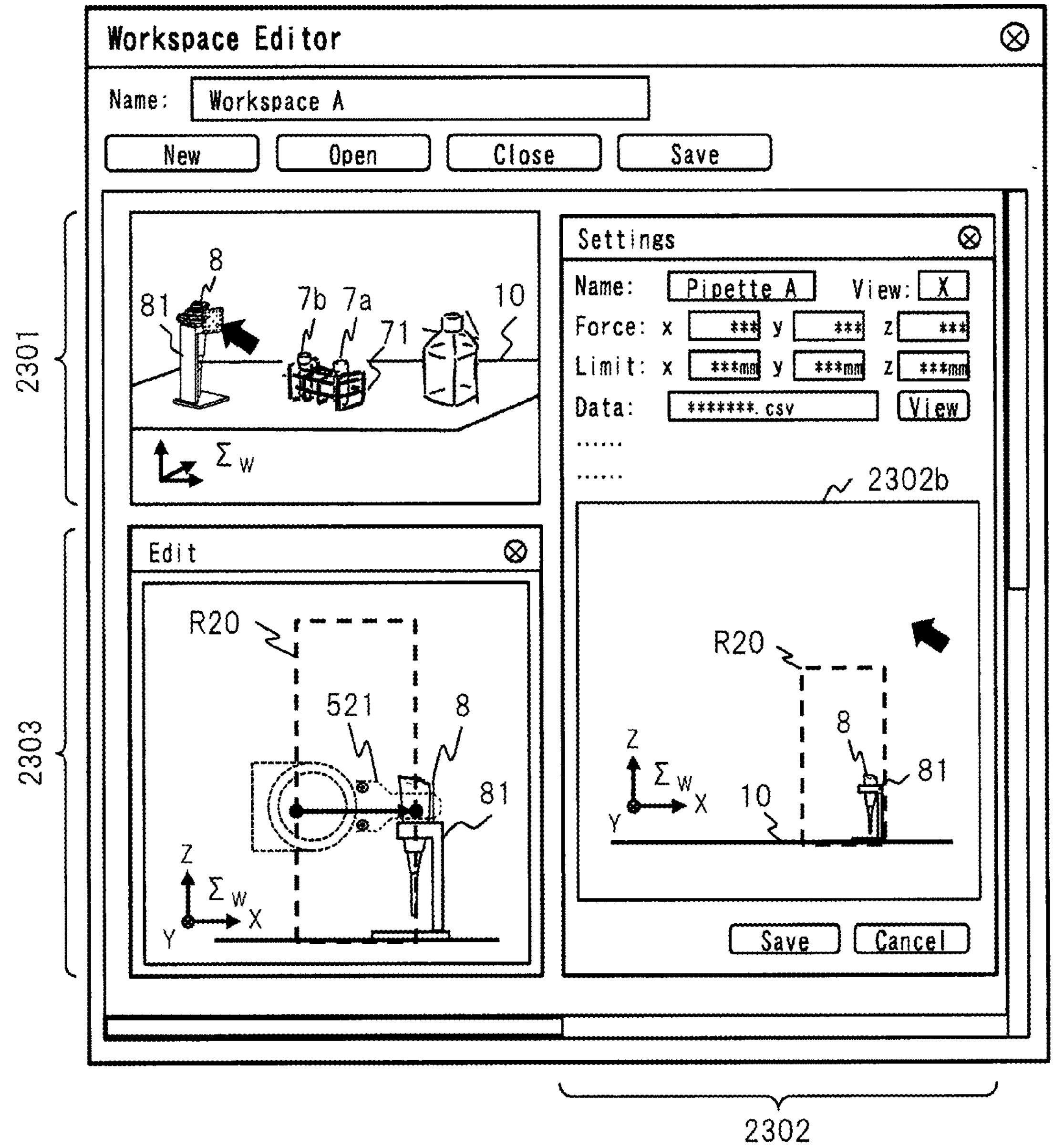

ROBOT TEACHING METHOD AND DEVICE

TECHNICAL FIELD

The present invention relates to a technique for teaching a human work motion to a robot.

BACKGROUND ART

Human work, i.e., work motion is, for example, a motion of a worker gripping a tool by hand, moving the tool, or releasing the tool in a factory or the like. A work motion includes one or more operations such as gripping and releasing. An operation includes a finer motion or movement such as moving an arm, moving a wrist, or moving a finger. To implement a motion of a robot corresponding to such a human work motion, there has been a technique of teaching the human work motion to the robot by demonstration.

For the sake of explanation, the main part for performing the target work/operation/motion or the like may be described as a human "hand" or a robotic "hand". This description means a hand in a broad sense, and is used as a generic term including a shoulder, an arm, a wrist, a palm, a finger, and the like in a human body or a robot including joints. When the hand moves, the arm or the like actually moves in conjunction with the hand in a narrow sense. To distinguish from a "human hand", a "robotic hand" may be referred to as a hand portion, a hand mechanism, a gripping portion, a gripping mechanism, or the like.

Examples of the related art include the following. Examples of an operation object in an operation include a tool, a member, or the like as a gripping object. A hand at the distal end of a robotic arm is provided with a mechanism that enables an operation such as gripping. The system detects a human hand gripping a gripping object by a camera or the like, determines the position and the posture of the gripping object relative to the position and the posture of the hand, and associates the position and the posture of the robotic hand with the determined position and posture. Accordingly, the system generates data on the motions of the robotic hand or the like corresponding to the human work motion.

Examples of the background art include JP2021-167060A (PTL 1). As "robot teaching by human demonstration", PTL 1 recites "providing a method of teaching a robot to operate based on a human demonstration using an image from a camera", and recites "this method includes: a teaching step of a 2D camera or a 3D camera detecting a human hand gripping and moving a workpiece, analyzing an image of the hand and the workpiece, and determining a posture and a position of a robot gripping portion equal to the posture and the position of the hand and corresponding position and posture of the workpiece; and subsequently generating a robot programming command from the posture and the position of the gripping portion calculated for the posture and the position of the workpiece", etc.

CITATION LIST

Patent Literature

PTL 1: JP2021-167060A

SUMMARY OF INVENTION

Technical Problem

To replace work performed by a person with a motion of a robot, teaching needs to be performed by replacing the human work motion with a motion that can be performed by the robot, which has a physique and a joint structure different from the person. Such work teaching requires much labor, time, and cost for introduction and implementation.

To improve the efficiency of the work teaching as described above, as disclosed in PTL 1, there has been a method of detecting a human work motion or the like using a camera or the like, and converting the human work motion into a motion of a robot to reproduce the work motion.

Unfortunately, except for special cases, the structure of joints and movements of human hands, etc. and the structure of joints and movements of robotic hands, etc. are often different. Therefore, due to the difference, for a person who demonstrates a work motion for teaching in the related art, the person as the demonstrator needs to perform the work motion while approaching (e.g., simulating) a motion that can be performed by a robotic hand or the like, in consideration of the structure, restriction, and the like of the robotic hand or the like in advance. In the example of PTL 1, depending on the shape of the robot gripping portion or the shape of the gripping object, it is necessary to change the posture of the hand during normal human work in accordance with a posture that can be easily reproduced by the robot gripping portion. In this case, however, the demonstrator of the work motion is required to have knowledge on the mechanism of the robot, which causes a heavy burden for demonstrating the work demonstration and makes efficient teaching difficult.

In addition, in the robot teaching method as in the example of the background art, it is necessary to analyze an image of a camera and determine the position and the posture of each part. This may require advanced image analysis or calculation resources, and may make it difficult to determine the correspondence correlation between the human hand and the robotic hand. In the example of PTL 1, to ensure the work accuracy, it is necessary to recognize the posture of the human hand with high accuracy and associate the recognition result with the robot gripping portion. The pre-adjustment for this recognition and association takes a lot of man-hours.

An object of the present disclosure is to provide a technique that allows even a person without knowledge on robots about techniques related to robot teaching to intuitively and efficiently teach a work motion a robot by a work demonstration while maintaining a normal human motion as much as possible, and that can reduce the man-hours for pre-adjustment of teaching, facilitate the introduction, etc.

Solution to Problem

A representative embodiment of the present disclosure has the following configuration. A robot teaching method according to an embodiment is a robot teaching method for performing teaching for generating robotic motion data based on measurement of a work motion including an operation on an operation object by a hand of a teacher, the robotic motion data including a sequence of joint displacement as a motion of a robotic hand mechanism corresponding to the work motion. The robot teaching method includes, as steps performed by a computer system: a step of acquiring a first measured pose obtained by measuring a time-series pose including a position and a posture of the operation object during the work motion; a step of acquiring a second measured pose obtained by measuring a time-series pose including a position and a posture of the hand of the teacher during the work motion; a step of detecting the operation on the operation object by the teacher; and a step of generating a teaching pose for generating the robotic motion data based on the first measured pose, the second measured pose, and the detected operation.

Advantageous Effects of Invention

A representative embodiment of the present disclosure allows even a person without knowledge on robots about techniques related to robot teaching to intuitively and efficiently teach a work motion a robot by a work demonstration while maintaining a normal human motion as much as possible, and can reduce the man-hours for pre-adjustment of teaching, facilitate the introduction, etc. The problems, configurations, effects, and the like other than those described above will be made clear in the embodiments for carrying out the invention.

BRIEF DESCRIPTION OF DRAWINGS

FIG. 1 illustrates an overall configuration outline of a robot teaching system as a robot teaching device according to Embodiment 1.

FIG. 2 illustrates a functional block configuration example of a control device in the robot teaching device of Embodiment 1.

FIG. 3 illustrates a configuration example of a computer system constituting the control device of the robot teaching device according to Embodiment 1.

FIG. 4 illustrates an arrangement example of a camera and the like relative to a work table in Embodiment 1.

FIG. 5 illustrates a configuration example of a test tube as a gripping object and a marker plate placed on the test tube in Embodiment 1.

FIG. 6 illustrates a configuration example of a pipette as a gripping object and a marker plate placed on the pipette in Embodiment 1.

FIG. 7A illustrates a configuration example of a marker plate attached to the right hand of a teacher in Embodiment 1.

FIG. 7B illustrates a configuration example of a marker plate attached to the left hand of the teacher in Embodiment 1.

FIG. 8 illustrates a perspective view of a state in which a hand portion of a robotic hand mechanism grips the test tube in Embodiment 1.

FIG. 9A illustrates a side view of a state in which the hand portion grips the test tube in Embodiment 1.

FIG. 9B illustrates a top view of a state in which the hand portion grips the test tube in Embodiment 1.

FIG. 10 illustrates a correlation between a coordinate system of a marker of the test tube and a coordinate system of the hand portion in the top view when the hand portion grips the test tube in Embodiment 1.

FIG. 11 illustrates a correlation between a coordinate system of a marker of the left hand and a coordinate system of the hand portion in the top view when the hand of the teacher grips the test tube in Embodiment 1.

FIG. 12 illustrates a left hand gripping operation and a right hand gripping operation as an example of a work motion of the teacher in Embodiment 1.

FIG. 13 illustrates a state in which the pipette of the right hand approaches the test tube of the left hand as an example of the work motion of the teacher in Embodiment 1.

FIG. 14 illustrates a processing flow in the robot teaching method and device according to Embodiment 1.

FIG. 15A illustrates a graph of a first measured pose, a second measured pose, and the like in Embodiment 1.

FIG. 15B illustrates a graph of poses before and after correction related to errors in Embodiment 1.

FIG. 15C illustrates a graph of a generated teaching pose in Embodiment 1.

FIG. 16A illustrates a graph of pose correction in Modification 1A of Embodiment 1.

FIG. 16B illustrates a graph before pose correction in Modification 1B of Embodiment 1.

FIG. 16C illustrates a graph after pose correction in Modification 1B of Embodiment 1.

FIG. 17A illustrates a graph of pose correction in Modification 1C of Embodiment 1.

FIG. 17B illustrates a graph of pose correction in Modification 1D of Embodiment 1.

FIG. 18 illustrates a display example of a screen including a GUI in Embodiment 1.

FIG. 19 illustrates an example of a state in which the pipette is placed on a holder on the work table in the robot teaching method and device according to Embodiment 2.

FIG. 20 illustrates an example of the setting contents of a correction area corresponding to the restriction when the hand portion of the robotic hand mechanism performs the motion of gripping the pipette of the holder in Embodiment 2.

FIG. 21A illustrates a graph of a first measured pose, a second measured pose, and the like in Embodiment 2.

FIG. 21B illustrates a graph of correction related to the operation restriction in Embodiment 2.

FIG. 21C illustrates a graph of a generated teaching pose in Embodiment 2.

FIG. 22A illustrates a graph of pose correction in Modification 2A of Embodiment 2.

FIG. 22B illustrates a graph of pose correction in Modification 2B of Embodiment 2.

FIG. 22C illustrates a graph of pose correction in Modification 2C of Embodiment 2.

FIG. 23 illustrates a display example of a screen including a GUI in Embodiment 2.

DESCRIPTION OF EMBODIMENTS

Hereinafter, embodiments of the present disclosure will be described in detail with reference to the drawings. In the drawings, the same components are denoted by the same reference numerals in principle, and repeated description thereof is omitted. In order to facilitate understanding, expressions of components in the drawings may not represent the actual position, size, shape, range, and the like. To distinguish among a plurality of similar components, the components may be expressed by adding letters or the like to the end of a reference numeral indicating a higher-order concept.

For the sake of description, in the case of describing processing executed by a program, a program, a function, a processing unit, and the like may be described as a main body, but a main body of hardware thereof is a processor, or a controller, a device, a computer, a system or the like implemented with a processor. The computer executes processing according to a program read onto a memory by a processor while appropriately using resources such as a memory and a communication interface. Accordingly, a predetermined function, processing unit, and the like are implemented. The processor is implemented with, for example a semi-conductor device such as a CPU/MPU or a GPU. Processing can be executed not only by a software program but also by a dedicated circuit. The dedicated circuit may be an FPGA, an ASIC, a CPLD, or the like.

The program may be installed as data in a target computer in advance, or may be distributed as data from a program source to a target computer. The program source may be a program distribution server on a communication network, or may be a non-transitory computer-readable storage medium, for example, a memory card or a disk. The program may include a plurality of modules. The computer system may include a plurality of devices. The computer system may be configured with a client server system, a cloud computing system, an IoT system, or the like. The various data and information are configured with a structure such as a table or a list, but are not limited thereto. The expressions such as identification information, identifier, ID, name, and number can be mutually replaced.

<Solutions, Etc.>

The robot teaching method and device according to an embodiment have the following configuration. The robot teaching method according to the embodiment is a method for teaching a work motion including an operation on an operation object by a human hand to a robot including a mechanism capable of operating an operation object such as a hand mechanism. In this method, a camera, a sensor, or a measurement device can be used to measure or detect a pose including a position and a posture of an object in a time-series. The object is the human hand, a tool or member as an operation object, or a marker or the like attached thereto. The position is, for example, a positional coordinate in a three-dimensional coordinate system space. The posture is, for example, the orientation of each axis of the three-dimensional coordinate system. The pose refers to a trajectory obtained by connecting the position and the posture at each time point in the time-series.

The robot teaching method according to the embodiment includes a step of measuring, as poses of measurement targets, a first pose which is the pose of the operation object such as a tool, and a second pose which is the pose of a hand of the teacher. The first pose may be described as a tool-side pose or the like. The second pose may be described as a hand-side pose or the like. More specifically, these steps may include: a step of measuring the pose of a first marker placed on the operation object and obtaining the pose as a first measured pose; and a step of measuring the pose of a second marker placed on the hand and obtaining the pose as a second measured pose.

The robot teaching method according to the embodiment includes a step of generating a teaching pose which is a pose for teaching the work motion to generate a motion of the robot, in other words, teaching data, based on the first pose and the second pose.

The robot teaching method according to the embodiment includes: a step of starting the measurement or generation based on a teaching instruction by an administrator or the teacher such as the start of a work demonstration; and a step of ending the measurement or generation based on a teaching instruction by the administrator or the teacher such as the completion of the work demonstration.

The robot teaching method according to the embodiment includes a step of detecting an operation on the operation object by the teacher, more specifically, a step of detecting an operation instruction by the teacher. After starting the work demonstration, the teacher may input an operation instruction as appropriate during the work motion. This operation instruction is an input for the teacher to notify the system that "an operation of gripping or releasing the operation object is currently being executed or has been executed". The operation instruction may be input using, for example, an instruction input device. Alternatively, the robot teaching device according to the embodiment may detect the operation from an image of the camera or the like.

The step of generating the teaching data in the robot teaching method according to the embodiment is a step of generating a teaching pose based on the first pose and the second pose in response to the detection of the operation.

The robot teaching method according to the embodiment includes a step of generating a motion of the robot based on the generated teaching pose. More specifically, this step is a step of generating robotic motion data including a sequence of joint displacement for causing the motion of the robot.

Further, in the robot teaching method according to the embodiment, the step of generating the teaching data includes a step of determining an error between the first measured pose of the first marker on the tool side and the second measured pose of the second marker on the hand side when the teacher operates the operation object. This method further includes a step of generating teaching data by using the error to correct the first measurement data and the second measurement data.

A robot teaching method according to another embodiment includes a step of, based on the structure of the robotic hand mechanism or the like, the structure such as the shape of the operation object such as a tool, correction data obtained in consideration of a restriction corresponding to the structure, and the first pose and the second pose, generating an operation pose as a pose enabling an operation on the operation object so as to satisfy the restriction. This method includes a step of generating the teaching data by using the operation pose to replace or correct a corresponding part in the teaching pose.

The structure of the robotic hand mechanism or the like is a structure of a mechanism that is attached to the distal end of an arm and enables an operation on the operation object, for example, a gripping mechanism as an end effector, and varies depending on the implementation. The structure such as the shape of the operation object such as a tool is, for example, a structure of a pipette, a test tube, or the like, and varies depending on the implementation. The restriction is a restriction related to allowable direction, position, distance, speed, force, or the like when the hand mechanism accesses or moves to a site such as a pipette for an operation such as gripping.

Embodiment 1

The robot teaching method and device according to Embodiment 1 of the present disclosure will be described with reference to FIGS. 1 to 18. The robot teaching method according to Embodiment 1 includes steps performed by the robot teaching device according to Embodiment 1. The robot teaching device according to Embodiment 1 is a system including at least a computer.

[Robot Teaching System]

FIG. 1 illustrates an overall configuration outline of a robot teaching system 1 as a robot teaching device 1 according to Embodiment 1. The robot teaching system 1 is a device or a system for teaching a work motion of a worker U1 as a person to a robot 2. The worker U1 may be referred to as a first user, a teacher, or the like. Such teaching may be referred to as work teaching or the like. The robot teaching system 1 includes a robot teaching control device 100. The robot teaching control device 100 may be simply referred to as a control device.

The work motion is a motion constituting a predetermined work to teach. The target predetermined work is work to be implemented by the worker U1 using at least one hand as a hand 5 to operate a predetermined tool or member with the hand 5. Examples of the work motion and the operation include a motion of gripping a tool such as a test tube 7 with a left hand 5L or a right hand 5R as one hand 5 and a motion of releasing the tool. Examples of the operation object, in particular, a tool as a gripping object include the test tube 7 and a pipette 8. At the time of teaching, a model may be used as the tool such as the test tube 7 instead of a real object.

The method and device according to Embodiment 1 will describe an example in which the worker U1 as a teacher teaches a work of operating the tool as the operation object to the robot 2. An example of teaching a work motion of gripping the test tube 7 with the left hand 5L on a work table 10 will be mainly described. FIG. 1 illustrates not only this example but also an example of gripping the pipette 8 with the right hand 5R. The test tube 7 is a tube accommodating a substance. The pipette 8 is a micropipette capable of aspirating a substance from the test tube 7 and discharging a substance into the test tube 7.

As illustrated in FIG. 4 described later, the work table 10 is set with a coordinate system Σw as a work table coordinate system. The pose of each part such as the tool and the hand 5 is expressed as a position and a posture in the coordinate system Σw. The surface of the work table 10 is also provided with, as examples: a holder 81 for holding the pipette 8, in other words, a pipette stand; a holder 71 for holding the test tube 7, in other words, a test tube stand; and the like. The left hand 5L and the right hand 5R of the hand 5 of the worker U1 are generic names including the forearm to the fingertips unless otherwise specified.

The robot teaching system 1 includes a control device 100, cameras 20 {20*a*, 20*b*, 20*c*, 20*d*} placed on the work table 10, markers 3 (3*a*, 3*b*) placed on the test tubes 7 (7*a*, 7*b*), a marker 3 (3*p*) placed on the pipette 8, and markers 4 (4L, 4R) attached to the hands 5 (5L, 5R) of the teacher U1.

The control device 100 is externally connected to an input/output device 120 or the like. The control device 100 may be alternatively incorporated with an input/output device 120 or the like. The input/output device 120 is a device for receiving settings and instructions related to calculation of the control device 100 and outputting data and information related to the calculation such as states and results.

The cameras 20 (20*a* to 20*d*) are devices constituting the motion capture system 200 in FIG. 2, such as cameras. The cameras 20 may be replaced with a sensor, a measurement device, or the like. The motion capture system 200 includes at least the cameras 20, but the details are not limited thereto, and may include other components such as a processor and a circuit. For example, the motion capture system 200 may store and output data and information on a result detected by the processor processing an image of the cameras 20.

In the present example, markers 3*a*, 3*b*, and 3*p* are provided as the markers 3 as the first marker on the tool side. The marker 3*a* and the marker 3*b* are marker plates placed on the test tubes 7 (7*a*, 7*b*) as operation objects by the teacher U1 and the robot 2 and as a first tool. Similarly, the marker 3*p* is a marker plate placed on the pipette 8 as an operation object by the teacher U1 and the robot 2 and as a second tool. The markers 3 on the tool side are placed at positions without hindering an operation such as gripping by the hand 5 or the hand mechanism 6.

Further, in the present example, markers 4L and 4R are provided as the markers 4 as the second marker on the hand 5 side. The markers 4 (4L, 4R) are marker plates attached to the left hand 5L and the right hand 5R as the hands 5 of the teacher U1. The markers 4 on the hand 5 side are placed, for example, on the forearm near the wrist as a position without hindering a motion using the wrist. To distinguish the tool side and the hand side from each other, the tool side may be referred to as first and the hand side may be referred to as second.

The robot 2 is a robot including hand mechanisms 6 (6L, 6R) or the like as a dual-arm mechanism capable of performing an operation such as gripping an object and positioning to any position and posture within a movable range. The robot 2 includes stereo cameras 30 at a portion corresponding to the eyes on the head. The robot 2 has a joint axis at the neck and can direct the stereo cameras 30 in any direction on the work table 10. The robot 2 can detect and recognize an object in the field of view based on imaging and distance measurement by the stereo cameras 30. The robot 2 is placed, for example, on an unmanned carrier (not illustrated), and can autonomously move in front of the work table 10 by moving in the room using a map of the room created in advance.

The robot 2 at least has a mechanism associated with a portion including a joint mechanism and portions such as a forearm, an elbow, a wrist, a palm, and fingers as a human hand. This mechanism is collectively referred to as a hand mechanism 6. The hand mechanisms 6 (6L, 6R) have end effectors 9 (9L, 9R) at distal ends thereof.

The robot 2 is controlled by the robot teaching control device 100. The robot teaching control device 100 controls the motion of the robot 2 based on robotic motion data generated by a teaching function 100F. Without being limited thereto, the robot teaching control device 100 may alternatively include a control device dedicated to the robot 2. In this case, the dedicated control device controls the motion of the robot 2 based on robotic motion data from the robot teaching control device 100.

The example of Embodiment 1 will mainly describe an example of teaching a work motion using one human hand to one robot 2 having such dual-arms. Without being limited thereto, the teaching in the embodiment is also applicable to a case of targeting a plurality of dual-armed robots or one or a plurality of single-armed robots. If a plurality of single-armed robots or dual-armed robots are used, the robots may be robots of different types, for example, robots having different mechanisms. In addition, the teaching in the embodiment is not limited to a work motion using one hand, the left hand 5L or the right hand 5R, and is similarly applicable to a work motion using both hands. In addition, the teaching in the embodiment is not limited to a work motion including gripping as an example of the operation using the test tube 7 or the pipette 8 as an example of the tool, and is similarly applicable to other operations using other tools.

The robot teaching control device 100 has the teaching function 100F as a main function. The teaching function 100F is implemented with processing of the processor. As illustrated, as an outline, the teaching function 100F includes a function of performing pose measurement related to the work motion, generation of the teaching data related to the work motion, and generation of the robotic motion data.

[Robot Teaching Control Device]

FIG. 2 illustrates a functional block configuration example of the robot teaching control device 100 in FIG. 1. The control device 100 includes, as input/output components, a motion capture system 200, an instruction input device 300, and an input/output device 120. The control device 100 can be implemented using, for example, a computer such a general PC or as a server, but is not limited thereto.

The control device 100 includes, as internal functional blocks, a pose measurement unit 101, a first measured pose storage unit 102, a second measured pose storage unit 103, an operation instruction detection unit 104, a teaching instruction detection unit 105, a correction data storage unit 106, a teaching data generation unit 107, a teaching data storage unit 108, a robotic motion generation unit 109, a robotic motion data storage unit 110, a robotic motion execution unit 111, and an operation pose generation unit 112. The operation pose generation unit 112 is not used in Embodiment 1, and the operation pose generation unit 112 is used in Embodiment 2 described later.

Based on the markers 3 and 4, the pose measurement unit 101 measures the positions and postures in the three-dimensional space of the markers and the corresponding objects on the human hand 5 side and the tool side as a time-series pose from the images captured by the cameras 20 (20*a* to 20*d*) of the motion capture system 200. The pose measurement unit 101 measures the pose of each of the markers 3*a*, 3*b*, and 3*p* as the markers 3, which are the first marker on the tool side, as the first measured pose. The pose measurement unit 101 measures the pose of each of the markers 4L and 4R as the markers 4, which are the second marker on the hand 5 side of the worker U1, as the second measured pose.

The first measured pose storage unit 102 stores data on the first measured pose based on a command from the pose measurement unit 101. The second measured pose storage unit 103 stores data on the second measured pose based on a command from the pose measurement unit 101. Various data storage units, in other words, storage units may be implemented not only by using a memory or the like in the control device 100 but also by using an external storage device or the like for the control device 100.

The operation instruction detection unit 104 detects a predetermined operation by the teacher U1, in other words, an operation instruction, in synchronization with the measurement by the pose measurement unit 101 during the teaching work by the teacher U1. This operation instruction is input proactively and intentionally by the teacher U1. The predetermined operation is, for example, an operation of gripping or an operation of releasing the test tube 7 or the pipette 8 as a tool as a gripping object. The corresponding operation instruction is a gripping operation instruction for notifying of the gripping operation or a releasing operation instruction for notifying of the releasing operation.

The operation instruction detection unit 104 detects, for example, input of an operation instruction by the teacher U1 using the instruction input device 300. Although not illustrated in FIG. 1, the instruction input device 300 may use various input devices such as a pressure-sensitive switch attached to a finger of the teacher U1, a foot switch operated under a foot by the teacher U1, and a microphone or a voice recognition device for inputting the voice of the teacher U1. The instruction input device 300 may be any other input unit that does not hinder the work motions of the teacher U1.

The operation instruction detection unit 104 may automatically determine and detect a predetermined operation based on an input image or measurement result of the pose measurement unit 101, without being limited to the input or the detection using the instruction input device 300. For example, the operation instruction detection unit 104 may detect a gripping operation when determining a change in the first measured pose of the gripping object or a change in the second measured pose of the hand 5 measured by the pose measurement unit 101, a state in which the first measured pose or the second measured pose keeps unchanged for a predetermined period or more, or the like.

The example of Embodiment 1 will mainly describe the gripping operation as the operation as the target of the teaching and the operation instruction detection, but is not limited thereto, and can be similarly applied to the cases targeting other operations such as pressing operation, pulling operation, and rotating operation.

During the work of the teaching work by the teacher U1, in synchronization with the measurement by the pose measurement unit 101, the teaching instruction detection unit 105 detects various teaching instructions such as an instruction for starting or completing the teaching work, an instruction for registering the teaching work content, and an instruction for checking the work state as teaching instructions. The teaching instruction is an instruction of processing to the control device 100, and examples thereof include a start instruction, a completion instruction, a pause instruction, a setting instruction, and a display instruction. These teaching instructions may be input by the worker U1 as the teacher or may be input by another administrator U2. The worker U1 may input the teaching instruction using the instruction input device 300. The worker U1 or the administrator U2 may input the teaching instruction using the input/output device 120. As an example of the teaching work, after the administrator U2 inputs a start instruction to start the teaching work, the worker U1 performs the teaching work while appropriately inputting operation instructions, and finally, the administrator U2 inputs a completion instruction to end the teaching work.

Without being limited to the detection of the input of the teaching instruction by the worker U1 or the administrator U2, the teaching instruction detection unit 105 may automatically determine and detect a teaching instruction based on an input image or measurement result in the pose measurement unit 101.

The teaching data generation unit 107 generates a teaching pose, which is a pose generated based on both the first measured pose and the second measured pose for generating a motion of the robot. The teaching data generation unit 107 generates the teaching pose based on the first measured pose, the second measured pose, the operation instruction, the teaching instruction, and the correction data, and stores the teaching pose in the teaching pose storage unit 108.

The correction data storage unit 106 stores correction data, which is data for correcting the position and the posture of the measured pose and the teaching pose. The control device 100 sets correction data in advance and stores the correction data in the correction data storage unit 106. In other words, the correction data is correction setting information. Examples of the correction data in Embodiment 1 include data for coordinate conversion described later and data for correction related to errors.

The teaching data generation unit 107 starts the teaching process including the generation of the teaching pose in response to the start instruction as the teaching instruction. The teaching data generation unit 107 ends the teaching process including the generation of the teaching pose in response to the completion instruction as the teaching instruction.

The teaching data generation unit 107 acquires the first measured pose stored in the first measured pose storage unit 102 and the second measured pose stored in the second measured pose storage unit 103, and generates the teaching pose by selecting one or both of the first measured pose and the second measured pose according to the timing and content of the operation instruction detected by the operation instruction detection unit 104, for example, a gripping operation instruction, or by processing the data. Further, at this time, the teaching data generation unit 107 acquires the correction data stored in the correction data storage unit 106, and generates a corrected teaching pose by correcting the position and the posture of the generated teaching pose based on the correction data.

For example, the teaching data generation unit 107 generates the teaching data in such a format that the information on the operation instruction detected by the operation instruction detection unit 104 and the information on the teaching instruction detected by the teaching instruction detection unit 105 are associated with the data on the teaching pose based on the measured pose in time-series while being synchronized in timing.

The teaching data storage unit 108 stores the generated teaching data based on a command from the teaching data generation unit 107. The teaching data storage unit 108 stores, as teaching data, data including the teaching pose generated by the teaching data generation unit 107 and the operation instruction and the teaching instruction synchronized with the teaching pose.

Based on the teaching data stored in the teaching data storage unit 108, the robotic motion generation unit 109 generates robotic motion data for the motion of the hand mechanism 6 or the like of the robot 2 according to the content of the operation in synchronization with the timing of the operation instruction detected by the operation instruction detection unit 104. The robotic motion data is data including a sequence of joint displacement of the hand mechanism 6 or the like of the robot 2, a motion command for a motion of the hand mechanism 6 or the like synchronized with the sequence of joint displacement, and the like. Examples of the motion of the hand mechanism 6 or the like include a motion of opening and closing the end effector 9 for gripping. The robotic motion data includes, for example, motion commands given to the robot 2 in a predetermined format, that is, data such as operation commands and commands.

In the present example, the robotic motion data can be generated by conversion from the teaching data, but is not limited thereto. For example, the teaching data generation unit 107 and the robotic motion generation unit 109 may be integrated, and the robotic motion data may be directly generated from the measured pose or the like as the teaching data.

The robotic motion data storage unit 110 stores the robotic motion data generated by the robotic motion generation unit 109. The robotic motion execution unit 111 drives the robot 2 in accordance with the contents of the robotic motion data stored in the robotic motion data storage unit 110, for example, in response to an instruction from the administrator U2, thereby executing the motion of the robot 2 corresponding to the taught work motion.

[Computer System]

FIG. 3 illustrates a configuration example of a computer system as an implementation example of the robot teaching control device 100 in FIG. 2. The computer system in FIG. 3 constituting the control device 100 includes at least a computer 1000. The computer 1000 includes a processor 1001, a memory 1002, a communication interface device 1003, and an input/output interface device 1004. These components are connected to a bus and can communicate with each other. The computer 1000 is externally connected to an input device 1005 and an output device 1006 corresponding to the input/output device 120 via the input/output interface device 1004. The computer 1000 may be alternatively incorporated with an input device 1005 and an output device 1006.

The processor 1001 includes a semi-conductor device such as a CPU, an MPU, or a GPU. The processor 1001 includes a ROM, a RAM, and various peripheral functions. The processor 1001 executes processing according to a control program 1011 of the memory 1002. This implements the functions such as the teaching function 100F. The teaching function 100F has an outline illustrated in FIG. 1, and is a function of: teaching a work motion to the robot 2 based on detection and measurement on a work demonstration of the teacher U1, in other words, a function of generating robotic motion data corresponding to the work teaching; a function of managing and controlling the robotic motion data; and the like.

The memory 1002 stores the control program 1011, setting information 1012, image data 1013, processing data 1014, and various data described later. The control program 1011 is a program for implementing functions by causing the processor 1001 to execute processing. The setting information 1012 is system setting information and/or user setting information for the functions. The image data 1013 is data such as an image acquired from the cameras 20 in FIG. 1. The processing data 1014 is data generated in the processing of the functions.

The communication interface device 1003 or the input/output interface device 1004 is a device for implementing a communication interface or the like with the units including the motion capture system 200 including the cameras 20 in FIG. 2, the instruction input device 300, and when connected to a communication network such as a LAN, the communication network. The input/output interface device 1004 is externally connected to the input device 1005 and the output device 1006 corresponding to the input/output device 120. The input device 1005 include, for example, a keyboard and a mouse. The output device 1006 include, for example, a display and a printer.

The computer 1000 may be connected to an external storage device, for example, a memory card, a disk, or the like via the communication interface or the like, or may be connected to a server device or the like as an external device via a communication network such as a LAN. The computer 1000 may appropriately read and write data and information from and to an external storage device, a server device, or the like.

The user uses the control device 100 through an input operation on the input device 1005 or a screen display of the output device 1006. The user may be the same person as the teacher U1 in FIG. 1, or may be a person other than the teacher U1, such as the administrator U2 of the robot teaching system 1. A user such as the administrator U2 may use the control device 1000 by accessing the control device 1000 from another client terminal through communication. That is, the function of the control device 1000 may be used in the form of a client server. In addition, the processing related to the functions of the control device 1000 may be performed online, which is substantially real-time, or may be performed offline after once acquiring and saving necessary data and information.

The case of using in the form of a client server may be implemented as follows, for example. The user accesses the server function of the control device 1000 from a client terminal. The server function of the control device 1000 transmits data including a graphical user interface (GUI), such as a web page, to the client terminal. The client terminal displays the web page or the like on the display based on the received data. The user views the web page or the like to check information related to the functions and input settings and instructions as necessary. The client terminal transmits the information input by the user to the control device 1000. The control device 1000 executes processing related to the functions based on the information input by the user, and saves the result. The control device 1000 transmits data including the processing result, such as a web page, to the client terminal. The client terminal displays the web page including the processing result and the like on the display. The user views and checks the processing result or the like.

[Work Table and Camera]

FIG. 4 illustrates the arrangement correlation between the work table 10 and the cameras 20, and illustrates a schematic view of a horizontal plane, which is the upper surface of the work table 10, as viewed from above in a vertical direction. As the cameras 20, four cameras 20*a*, 20*b*, 20*c*, and 20*d* are placed at different positions in a direction facing the work table 10 as illustrated. Visual fields 21*a* to 21*d* indicate the visual field ranges of imaging of the cameras 20*a* to 20*d*. The work table coordinate system, which is the illustrated coordinate system Σw, is a three-dimensional space coordinate system based on the surface of the work table 10. The two orthogonal axes constituting the horizontal plane are the X-axis and Y-axis, and the vertical direction perpendicular to these axes is the Z-axis. The origin of the coordinate system Σw is set to a predetermined position on the upper surface of the work table 10 as illustrated in FIG. 4, but is not limited thereto.

The cameras 20 (20*a* to 20*d*) image a range including the markers 3 (3*a*, 3*b*, 3*p*) placed on the test tube 7 or the pipette 8 as a tool placed on the upper surface of the work table 10 or a tool held by the hand of the worker U1, which are the first marker, or image a range including the markers 4 (4L, 4R) placed on the hand 5 side of the worker U1, which are the second marker. The pose measurement unit 101 measures the pose of the first marker and measures the pose of the second marker based on an image captured by the cameras 20.

To measure the markers 3 and 4, the cameras 20 (20*a* to 20*d*) are placed at positions opposite to the teacher U1 across the work table 10 with the optical axis being directed toward the teacher U1 and the tool. Further, the cameras 20 (20*a* to 20*d*) are placed at different positions such that the visual fields 21*a* to 21*d* overlap each other and almost cover the entire upper surface of the work table 10.

After the cameras 20 (20*a* to 20*d*) are placed on the work table 10, calibration of the motion capture system 200 is executed by capturing images of reflective markers (not illustrated) whose arrangement is known a plurality of times by the cameras 20. Based on the calibration, the coordinate system Σw is set as a coordinate system at the time of measurement by the motion capture system 200. The pose measured based on the motion capture system 200 is expressed based on the coordinate system Σw as the work table coordinate system. The pose measurement unit 101 of the control device 100 performs processing based on the coordinate system Σw.

The upper surface of the work table 10 is provided with markers 31 for the stereo cameras 30 of the robot 2. FIG. 4 illustrates three markers 31 whose arrangement is determined in advance. The arrangement of the markers 31 for the stereo cameras 30 is registered in the control device 100 in advance. When the robot 2 moves in front of the work table 10, the robot 2 can grasp the positional correlation between the robot 2 and the coordinate system Σw by measuring the markers 31 with the stereo cameras 30.

[Tool and First Marker]

FIG. 5 is a perspective view of the test tube 7 as an example of the first tool and the marker 3*a* as the first marker placed on the test tube 7. FIG. 6 is a perspective view of the pipette 8 as an example of the second tool and the marker 3*p* as the first marker placed on the pipette 8.

The marker 3 is a marker plate to be detected by the cameras 20 of the motion capture system 200. The marker 3 is not limited to a specific form, and can be applied with various forms. Embodiment 1 illustrates one example. The marker 3 in the present example is formed with, for example, four marker points as the reflective markers in a unique pattern on the surface of a rectangular flat plate, so that an ID or the like unique to each marker 3 can be detected. Each marker 3 is formed with marker points in different patterns. The marker points are also referred to as first reflective markers. In the present example, the surface of the rectangular flat plate is formed with marker points at four positions among 5×5 candidate locations. The marker 3*a* in FIG. 5 is formed with four marker points P31 to P34. The marker 3*p* in FIG. 6 is formed with four marker points P35 to P38.

The upper portion of the test tube 7*a* in FIG. 5 is attached with a predetermined attachment 72*a*, and the attachment 72*a* is attached with the marker 3*a*. The attachment 72*a* is a component configured in consideration of the hand 5 of the worker U1 or the hand mechanism 6 of the arm of the robot 2 gripping or otherwise operating the test tube 7*a* as a tool having a specific shape or the like, suitably installing the marker 3*a* on the tool, and the like.

The upper portion of the pipette 8 in FIG. 6 is attached with a predetermined attachment 82, and the attachment 82 is attached with the marker 3*p*. The attachment 82 is a component configured in consideration of the hand 5 of the worker U1 or the hand mechanism 6 of the arm of the robot 2 gripping or otherwise operating the pipette 8 as a tool having a specific shape or the like, suitably installing the marker 3*p* on the tool, and the like.

Further, the equipment of the marker 3 to the tool via the attachments 72 and 82 is designed in consideration of operations on the same location of the tool by the hand 5 of the worker U1 and the hand mechanism 6 of the robot 2. In addition, in the present example, the attachments 72 and 82 have a ring structure that supports the tool by clamping the diameter in accordance with the diameter of the tool, and have a structure that has the flat plate of the marker 3 fixed to one location of the ring.

The attachments 72 and 82 and the markers 3 in FIGS. 5 and 6 are each configured such that the flat plate of the marker 3 is fixed to one location on the side surface of the test tube 7 or the pipette 8, which is a substantially rod-shaped tool, and the Z-axis illustrated as the axis in a direction that is plane perpendicular to the flat plate of the marker 3 is perpendicular to the one location on the side surface of the tool.

The control device 100 can detecting, for example, the marker points P31 to P34 as the four reflective markers of the marker 3*a* from the image of the cameras 20, thereby specifying the ID unique to the marker 3*a* and the position and the posture in the three-dimensional space. Then, by specifying the ID, the position, and the posture of the marker 3*a*, it is possible to specify the ID, the position, and the posture of the test tube 7*a* as the tool associated with the marker 3*a*. Such an action is the same for the marker points P35 to P38 on the marker 3*p* of the pipette 8. Such an action is the same for the marker 4 attached to the hand 5 side of the worker U1 described later.

In the present example, the four marker points on each marker 3 are arranged non-symmetrically in the upper-lower and left-right directions. In other words, the four marker points on each marker 3 are arranged non-symmetrically with respect to the X, Y, and Z axes in a coordinate system $\Sigma_{TLM}$, which is a marker plate coordinate system illustrated in the drawing. This arrangement is an arrangement that allows four marker points, in other words, an icon formed by the marker points to be uniquely detected from an image of the cameras 20.

The markers 3 (3*a*, 3*b*) as the first marker are each set with a coordinate system $\Sigma_{TLM}$ as a marker plate coordinate system. The three axes X, Y, and Z in the coordinate system $\Sigma_{TLM}$ include an X-axis and a Y-axis as two orthogonal axes constituting the surface of the rectangular flat plate, and a Z-axis perpendicular to the X-Y plane of the X-axis and the Y-axis. The coordinate system $\Sigma_{TLM}$ of the first marker is also referred to as a first marker plate coordinate system.

The control device 100 registers in advance the positional correlation between the arrangement pattern of the four reflective markers P31 to P34 of the marker 3*a* in FIG. 5 and the coordinate system $\Sigma_{TLM}$ of the marker 3*a*. Similarly, the control device 100 registers in advance the positional correlation between the arrangement pattern of the four reflective markers P35 to P38 of the marker 3*p* in FIG. 6 and the coordinate system $\Sigma_{TLM}$ of the marker 3*p*. Based on these registered positional correlations, the pose measurement unit 101 in FIG. 2 measures the position and posture as the pose of the coordinate system $\Sigma_{TLM}$ of each marker 3 based on the coordinate system Σw as the work table coordinate system in FIG. 4. The position of the marker 3 may be represented by the origin $O_{TLM}$ in the coordinate system $\Sigma_{TLM}$, for example. The posture of the marker 3 can be expressed by the orientations of the X, Y, and Z axes.

The test tube 7*a* and the marker 3*a* in FIG. 5 are fixed via the attachment 72*a*, thereby maintaining a predetermined positional and posture correlation between the test tube 7*a* and the marker 3*a*. The pipette 8 and the marker 3*p* in FIG. 6 are fixed via the attachment 82, thereby maintaining a predetermined positional and posture correlation between the pipette 8 and the marker 3*p*. Accordingly, the positional and posture correlation between the tool as the operation object and the marker 3 is not changed during the teaching work.

The attachment 72 or 82 fixes the reflective markers of the marker 3 to the tool such as the test tube 7 or the pipette 8 at a position and an angle that allows the cameras 20 of the motion capture system 200 to easily measure the reflective markers. In addition, the attachments 72 and 82 are configured such that the marker 3 can be attached to and detached from the tool. In addition, the attachments 72 and 82 have a configuration such as a shape that does not hinder the teacher U1 or the hand mechanism from gripping or otherwise operating the tool.

[Second Marker on Hand Side]

FIGS. 7A and 7B are perspective views of the marker 4 attached to the hand 5 side of the worker U1, which is the second marker. FIG. 7A illustrates the marker 4R on the right hand 5R side, and FIG. 7B illustrates the marker 4L on the left hand 5L side. In the example of Embodiment 1, the marker 4, which is the second marker, has a configuration for being attached near the wrist of a human forearm, and specifically has an attachment 92 such as a wrist band. The marker 4R in FIG. 7A has an attachment 92R. The marker 4L in FIG. 7B has an attachment 92L.

In FIG. 7A, the marker 4R attached to the right hand 5R side is attached to one location on the side surface of the attachment 92R. Similarly to the marker 3 on the tool side, the marker 4 has a rectangular flat plate. The flat surface of the marker 4R in FIG. 7A is formed with four marker points P41 to P44 as the reflective markers. The flat surface of the marker 4L in FIG. 7B is formed with four marker points P45 to P48 as the reflective markers. The four reflective markers of each marker 4 are arranged non-symmetrically in the upper-lower and left-right directions and have a unique pattern, so that the ID, the position, and the posture can be detected for the marker 4.

In the example of Embodiment 1, the marker 4 is attached and fixed to a location of the forearm near the wrist using the attachment 92 such as a wrist band. This location is not the wrist itself. For the sake of explanation, this location may be referred to as a wrist portion. The configurations of the marker 4 and the attachment 92 are designed in consideration of, for example, fixing the marker 4 such that the positional and posture correlation of the marker 4 with respect to the hand 5 of the worker U1 does not change during the teaching work, easily detecting the marker points of the marker 4 by the cameras 20, and not hindering the gripping or other operations in the work motion.

The markers 4 are set with a coordinate system $\Sigma_{PRM}$ and a coordinate system $\Sigma_{PLM}$ as second marker plate coordinate systems. The marker 4R in FIG. 7A is set with the coordinate system $\Sigma_{PRM}$. The marker 4L in FIG. 7B is set with the coordinate system $\Sigma_{PLM}$. The three axes X, Y, and Z in the coordinate system $\Sigma_{PRM}$ and $\Sigma_{PLM}$ include an X-axis and a Y-axis as two orthogonal axes constituting the surface of the rectangular flat plate, and a Z-axis perpendicular to the X-Y plane of the X-axis and the Y-axis.

The control device 100 registers in advance the positional and posture correlation between the arrangement pattern of the four reflective markers P41 to P44 of the marker 4R and the coordinate system $\Sigma_{PRM}$. The control device 100 registers in advance the positional and posture correlation between the arrangement pattern of the four reflective markers P45 to P48 of the marker 4L and the coordinate system $\Sigma_{PLM}$. Based on the registered correlation, the pose measurement unit 101 measures the pose of each marker 4 based on the coordinate system Σw as the work table coordinate system.

The right wrist portion of the right hand 5R of the teacher U1 in FIG. 1 and the marker 4R are fixed via the attachment 92R such as a wrist band in FIG. 7A. The left wrist portion of the left hand 5L of the teacher U1 and the marker 4L are fixed via the attachment 92L in FIG. 7B. The attachment 92R maintains the positional and posture correlation between the right wrist portion and the marker 4R. The attachment 92L maintains the positional and posture correlation between the left wrist portion and the marker 4L.

The attachment 92 (92R, 92L) fixes the marker 4 (4R, 4L) to the wrist portion of the worker U1 at a position and a posture that can be easily measured by the cameras 20 of the motion capture system 200. In addition, the attachment 92 is configured such that the marker 4 can be attached to and detached from the hand 5 of the worker U1, and has adjustable attachment position and posture.

In Embodiment 1, the markers 3 (3*a*, 3*b*, 3*p*) which are the first marker on the tool side and the markers 4 (4L, 4R) which are the second marker on the hand 5 side are used as the plurality of markers illustrated in FIG. 1 and FIGS. 5 to 7B. These reflective markers included in each of the marker plates have a pattern unique to the marker plate as described above. Accordingly, the control device 100 can identify the five markers such as the markers 3*a*, 3*b*, and 3*p* and the markers 4L and 4R by using the individual as an ID, and can simultaneously measure the pose of each marker.

Instead of making the reflective markers have different patterns for each marker plate, the identification and pose measurement of each marker can also be implemented with a configuration of making the number, size, shape, color, and the like of the reflective markers different for each marker plate, or a configuration of describing the identification information. The number of reflective markers may be three or more for each marker plate. The number of reflective markers may be different for each marker. The first marker and the second marker may be applied with markers of different types or structures.

In the example of Embodiment 1, the plurality of reflective markers are arranged two-dimensionally on the surface of the rectangular flat plate, but may be arranged three-dimensionally. The reflective marker is configured with, for example, a light-reflective member so as to be easily detected by the cameras 20, but is not limited thereto. In addition, in the example, light from the marker plate is optically detected by the cameras 20, but is not limited thereto. For example, instead of the cameras 20, a motion capture system in a form of performing magnetic detection using a sensor such as a Hall element or a measurement device may be adopted to measure the pose of the operation object and the arm of the teacher U1 from the movement of the marker plate.

Alternatively, the motion of the operation object or the hand 5 of the teacher U1 may be imaged by the cameras 20 without using the marker plate, and the video of the cameras 20 may be analyzed to measure the pose. However, this case also has the problem described above. Therefore, the markers on the tool side and the hand 5 side are used as in Embodiment 1. Accordingly, it is possible to easily determine the correspondence correlation between the hand 5 of the worker U1 and the hand mechanism 6 of the robot 2 without requiring advanced image analysis or calculation resources, and to perform efficient measurement and teaching.

[Robotic Hand Mechanism]

Returning to FIG. 1, as hand mechanisms 6 configured to imitate human hands, the robot 2 includes the hand mechanism 6R including an arm on the right arm side and the hand mechanism 6L including an arm on the left arm side. In particular, each hand mechanism 6 includes an end effector 9 at a portion corresponding to the hand tip. The hand mechanism 6R includes an end effector 9R, and the hand mechanism 6L includes an end effector 9L. In the example of Embodiment 1, the end effector 9 is a gripping mechanism capable of gripping and releasing the tool as the operation object.

FIGS. 8 to 10 illustrate the hand mechanism 6 of the robot 2 using an example of gripping the test tube 7. FIGS. 11 and 12 illustrate the correlation of the coordinate system and the like. The correlation between the pose and the coordinate system among the hand mechanism 6L on the left side of the robot 2, the left hand 5L of the worker U1, and the test tube 7*a* as the gripping object will be described as an example with reference to FIGS. 8 to 11.

FIG. 8 is a perspective view of the left hand mechanism 6L. FIG. 8 illustrates a hand portion 520 as a part of the hand mechanism 6L. In other words, the hand portion 520 is a link mechanism imitating a wrist of a person or the like, and is a mechanism capable of rotating around the axis of a flange 522. The hand portion 520 includes a gripping mechanism as the end effector 9L at the distal end. In the present example, the gripping mechanism includes finger mechanisms 521*a* and 521*b* as two finger mechanisms. The test tube 7 is gripped by the finger mechanisms 521*a* and 521*b* of the end effector 9L. The finger mechanisms 521*a* and 521*b* are movable in the left-right direction corresponding to the Y-axis in FIG. 8 by a slide drive mechanism. The test tube 7 can be gripped by closing the finger mechanisms 521*a* and 521*b*, and the test tube 7 can be released by opening the finger mechanisms 521*a* and 521*b*. The test tube 7 is gripped by the finger mechanisms 521*a* and 521*b* of the hand portion 520 with an appropriate pressure.

FIG. 9A is a side view of the hand mechanism 6L in FIG. 8 as viewed from the lateral side (the direction of the Y-axis in the drawing), and FIG. 9B is a top view of the hand mechanism 6L in FIG. 8 as viewed from above (the direction of the X-axis in the drawing). FIGS. 8 to 10 illustrate a state in which, for example, the hand portion 520 of the hand mechanism 6L on the left side of the robot 2 grips one portion of the side surface of the upper portion of the test tube 7 in such a posture that the long axis of the test tube 7 is arranged along the vertical direction, so as to clamp the one location from the left and right by the finger mechanisms 521*a* and 521*b* of the end effector 9L.

In FIGS. 9A and 9B, the gripping center of the finger mechanisms 521*a* and 521*b* of the end effector 9L in the hand portion 520 of the hand mechanism 6L is set with a coordinate system $\Sigma^{LT}$ as a left gripping portion coordinate system. The gripping center also corresponds to the position of the test tube 7. Among the three axes X, Y, and Z of the coordinate system $\Sigma_{LT}$, the vertical direction along the long axis of the test tube 7 is the X-axis, the front-back direction with respect to the gripping mechanism of the hand portion 520 is the Z-axis, and the left-right direction of the gripping mechanism is the Y-axis.

The flange 522 is a mechanism corresponding to the left wrist portion (in other words, the left link) of the arm of the robot 2 attached with the hand portion 520 of the hand mechanism 6L. The center of the flange 522 is set with a coordinate system $\Sigma_{LE}$ as a left link distal end coordinate system. Among the three axes X, Y, and Z of the coordinate system $\Sigma_{LE}$, similarly to the coordinate system $\Sigma_{LT}$, the upper-lower direction is the X-axis, the front-rear direction is the Z-axis, and the left-right direction is the Y-axis with respect to the hand portion 520. FIGS. 9A and 9B illustrate the positional and posture correlation between the coordinate system ΣLT and the coordinate system $\Sigma_{LE}$. The origin Our of the coordinate system $\Sigma_{LT}$ and the origin $O_{LE}$ of the coordinate system $\Sigma_{LE}$ in FIGS. 9A and 9B have a distance Lt in the Z-axis direction.

Although not illustrated, the right hand mechanism 6R of the robot 2 may have the same structure as the left hand mechanism 6L. For example, the right hand mechanism 6R can grip the pipette 8 in the same manner. As a matter of course, the left and right hand mechanisms may have different structures.

[Coordinate System Correlation Among Tool, Hand Mechanism, Hand, and Markers]

FIG. 10 is a schematic diagram of the correlation between the coordinate systems ($\Sigma_{LT}$, $\Sigma_{LE}$) set in the hand mechanism 6L in FIG. 9B and the coordinate system $\Sigma_{TLM}$ set in the marker 3*a* of the test tube 7*a*. FIG. 10 illustrates the correlation between the coordinate system ELT as the left gripping portion coordinate system set in the hand portion 520 of the hand mechanism 6L gripping the test tube 7, the coordinate system $\Sigma_{LE}$ (FIGS. 9A and 9B) as the left link distal end coordinate system, and the coordinate system $\Sigma_{TLM}$ (FIG. 5) as the first marker plate coordinate system set in the marker 3*a* as the first marker on the test tube 7 side. For ease of understanding, FIG. 10 virtually illustrates a state in which the marker 3*a* is attached to the test tube 7*a* with a dotted line.

FIG. 11 is a schematic diagram of the correlation between the coordinate system $\Sigma_{LT}$ of the same test tube 7*a* as in FIG.

10 and the hand mechanism 6L associated therewith and the coordinate system $\Sigma_{PLM}$ set to the marker 4L of the left hand 5L of the worker U1. Corresponding to FIG. 10, FIG. 11 illustrates the correlation between the test tube 7*a* gripped by the left hand 5L of the worker U1, the coordinate system $\Sigma_{LT}$ and the coordinate system $\Sigma_{LE}$ of the hand mechanism 6L (not illustrated), and the coordinate system $\Sigma_{PLM}$ (FIG. 7B) set in the marker 4L on the left hand 5L side. FIG. 11 illustrates a state in which fingers 1101 of the left hand 5L, for example, the thumb and another finger grip one location of the side surface of the upper portion of the test tube 7*a* in the same posture as that in FIG. 10 that the long axis of the same test tube 7*a* is arranged along the vertical direction, so as to clamp the one location from the left and right. FIG. 11 illustrates a state in which the flat plate of the marker 4L is arranged on one side surface in the direction corresponding to the palm back 1102 at a location near the wrist on the side surface of the forearm of the left hand 5L, via the attachment 92L.

The correlation among the coordinate system ($\Sigma_{LT}$, $\Sigma_{LE}$) set in the hand portion 520 of the left hand mechanism 6L of the robot 2, the coordinate system $\Sigma_{TLM}$ set in the marker 3*a* on the test tube 7*a* side as the tool, and the coordinate system $\Sigma_{PLM}$ set in the marker 4L on the left hand 5L side will be described with reference to FIGS. 10 and 11. The correlation among the coordinate systems can be grasped by considering FIGS. 10 and 11 together.

As illustrated in FIG. 10, the coordinate system $\Sigma_{TLM}$ Of the marker 3*a* is obtained by translating the coordinate system $\Sigma_{LT}$ as the left gripping portion coordinate system by a distance Lm in the Z-axis direction (rightward in FIG. 10). The coordinate system $\Sigma_{LT}$ as the left gripping portion coordinate system is obtained by translating the coordinate system $\Sigma_{LE}$ as the left link distal end coordinate system by the distance Lt in the Z-axis direction.

Thus, by measuring the pose of the marker 3*a*, it is possible to calculate the pose of the origin $O_{LT}$ as the gripping center of the hand portion 520 at that time and calculate the pose of the origin $O_{LE}$ as the center of the left wrist flange 522 from the correlation among these coordinate systems. That is, from the pose of the marker 3*a*, the pose of the motion of the hand portion 520 of the hand mechanism 6L can be associated based on coordinate conversion.

In FIG. 10, as indicated by broken line arrows, the coordinate conversions that can be considered include: a coordinate conversion T1 between the coordinate system $\Sigma_{TLM}$ associated with the coordinate system of the gripping object based on the test tube 7*a* as the gripping object and the coordinate system $\Sigma_{LT}$ as the left gripping portion coordinate system of the distal end based on the hand portion 520 of the hand mechanism 6L; and a coordinate conversion T2 between the coordinate system $\Sigma_{LT}$ and the coordinate system $\Sigma_{LE}$. Further, in FIG. 11, a part of the coordinate conversion is represented by a conversion $T_{LT}$. The conversion $T_{LT}$ is a conversion from the pose of the marker 4L of the left hand 5L in the coordinate system $\Sigma_{PLM}$ to the pose in the coordinate system $\Sigma_{LT}$ corresponding to the gripping center of the test tube 7 at the distal end of the hand portion 520.

The teaching data generation unit 107 in FIG. 2 can perform such coordinate conversion based on the measurement of the pose of the marker 3*a* at the time of the work demonstration, thereby calculating the pose of the hand portion 520 of the hand mechanism 6L corresponding to the pose of the test tube 7*a* as the teaching pose.

In the present example, the teacher U1 grips the test tube 7*a* with the fingers 1101 of the left hand 5L in the pose as illustrated in FIG. 11, which is the same as in normal work. The hand portion 520 of the hand mechanism 6L in FIG. 10 is taught to grip the test tube 7 by the finger mechanisms 521*a* and 521*b* of the hand portion 520 in a pose similar to that in FIG. 11.

At this time, the coordinate system $\Sigma_{LT}$ as the left gripping portion coordinate system of the hand portion 520 gripping the test tube 7 is determined as the same coordinate system as that in FIG. 10. At the same time, the conversion $T_{LT}$ for deriving the coordinate system $\Sigma_{LT}$ from the coordinate system $\Sigma_{PLM}$ is determined based on the coordinate system $\Sigma_{PLM}$ Of the marker 4L of the left hand 5L. The control device 100 sets a conversion coefficient of the coordinate conversion in the conversion $T_{LT}$ in advance. This setting may be performed by the administrator U2 or may be calculated by the control device 100.

The conversion between the coordinate system $\Sigma_{LT}$ corresponding to the position of the test tube 7*a* and the gripping center and the coordinate system $\Sigma_{LE}$ as the left link distal end coordinate system is obtained by the coordinate conversion T2. Based on the correlation between these coordinate systems, a conversion T3 between the pose in the coordinate system $\Sigma_{PLM}$ of the marker 4L of the left hand 5L and the pose in the coordinate system $\Sigma_{LE}$ of the hand portion 520 is also possible. By measuring the pose of the marker 4L of the left hand 5L, the control device 100 can calculate the pose of the origin $O_{LT}$ as the gripping center of the hand portion 520 of the hand mechanism 6L at that time and can further calculate the pose of the origin $O_{LE}$ as the center of the flange 522 based on the conversion according to the correlation among these coordinate systems.

That is, the teaching data generation unit 107 in FIG. 2 is configured to generate the pose of the hand portion 520 as the teaching pose by conversion based on the correlation between the coordinate system $\Sigma_{PLM}$ based on the marker 4L on the left hand 5L side and the coordinate system $\Sigma_{LT}$ and the coordinate system $\Sigma_{LE}$ based on the hand portion 520 of the hand mechanism 6L.

In addition, based on the correlation among the coordinate systems and the teaching pose described above, the robotic motion generation unit 109 calculates the joint displacement of the mechanisms of the robot 2 as a solution of inverse kinematics from the time-series data on the pose of the center of the flange 522 of the hand mechanism 6 of the robot 2, that is, the distal end of the link. Then, the robotic motion generation unit 109 generates a sequence of joint displacement of the mechanisms of the robot 2 based on the calculation, and generates robotic motion data according to the sequence of joint displacement.

The pose in each coordinate system ($\Sigma_{TLM}$, $\Sigma_{TRM}$, $\Sigma_{PRM}$, $\Sigma_{PLM}$) related to the markers 3 and 4 and the pose in the coordinate systems ($\Sigma_{LE}$, $\Sigma_{LT}$) related to the hand mechanism 6 of the robot 2 can be expressed in a manner converted into the pose in the coordinate system Σw as the work table coordinate system based on the correspondence correlation among the coordinate systems.

Further, the correlation among the coordinate systems described above may be any known correlation among the coordinate systems, without being limited to the above-described correlation of the translation in the Z-axis direction in FIG. 10 or correlation involving rotation of coordinate systems such as the conversion $T_{LT}$. Further, the correlation among the coordinate systems does not need to be fixed, may be changed as long as the correlation is known.

The above example has described an example in which the test tube 7*a* is gripped by the left hand 5L of the teacher U1 and the hand mechanism 6L on the left side of the robot 2, but is not limited thereto, and can be similarly applied to a case where the pipette 8 or another test tube 7 is gripped or otherwise operated, or by the right hand 5R of the teacher U1 and the hand mechanism 6R on the right side of the robot 2.

Next, an example of a work motion of the teacher U1, work teaching using the control device 100, calculation and correction of the teaching pose for conversion into a motion of the robot 2, and the like in the robot teaching method and device according to Embodiment 1 will be described with reference to FIG. 12 and the subsequent drawings.

[Work Demonstration]

FIGS. 12 and 13 illustrate an example of a work motion of a work demonstration when the worker U1 as the teacher performs a teaching work using the robot teaching device 1. FIG. 12 illustrates a state in which the worker U1 uses both hands to grip the test tube 7 with the left hand 5L and grip the pipette 8 with the right hand 5R as a part of the work motion. First, the test tube 7 (7*a*, 7*b*) is held by the holder 71, and the pipette 8 is held by the holder 81. FIG. 13 illustrates a state in which the distal end of the pipette 8 of the right hand 5R approaches the mouth at the upper end of the test tube 7 in the left hand 5L when the worker U1 is to discharge the substance in the pipette 8 in the right hand 5R into the test tube 7 in the left hand 5L or is to aspirate the substance in the test tube 7 in the left hand 5L into the pipette 8 in the right hand 5R, as another part of the work motion after the work motion in FIG. 12.

As illustrated, the teacher U1 attaches the marker 4R as the second marker near the right wrist and the marker 4L near the left wrist. In FIG. 12, as the work demonstration, the teacher U1 performs an operation M1 of gripping the test tube 7*a* equipped with the marker 3*a*, which is the first marker, with the left hand 5L to teach the operation M1. The operation M1 is, in other words, a left hand gripping motion, a left hand gripping step, or a left hand gripping process. FIG. 12 also illustrates an operation M2 using the right hand 5R. As the work demonstration, the teacher U1 performs the operation M2 of gripping the pipette 8 equipped with the marker 3*p*, which is the first marker, with the right hand 5R to teach the operation M2. The operation M2 is, in other words, a right hand gripping motion, a right hand gripping step, or a right hand gripping process.

In the following description, the gripping operation M1 by the left hand 5L for the test tube 7*a* will be described as an example for the features and the like in Embodiment 1, and can be similarly applied to the operation M2 of the right hand 5R. In the following description, the poses measured and calculated by the control device 100 are based on the coordinate system Σw as the work table coordinate system.

[Processing Flow]

FIG. 14 illustrates a processing flow of the robot teaching device 1 and method according to Embodiment 1. The main subject of the processing is the control device 100. The flow in FIG. 14 includes steps S101 to S110. Assume that necessary correction data and the like have been set in advance.

In step S101, the teacher U1 or the administrator U2 inputs a start instruction as a teaching instruction. The teacher U1 starts a work motion as a work demonstration. In response to the start instruction, the system as the robot teaching device 1 starts measurement or the like, and the cameras 20 of the motion capture system 200 start imaging. In the work demonstration, the teacher U1 first starts the left hand gripping operation M1 in FIG. 13. At this time, through the processing of the teaching instruction detection unit 105, the control device 100 detects the start instruction, in other words, the start of the work demonstration, based on a voice signal such as "start" input via a microphone as the instruction input device 300, for example. Based on this, the control device 100 starts the measurement process of the pose measurement unit 101, and allows the teaching data generation unit 107 to generate data on a teaching command indicating the start of the teaching data ("start") in association with the teaching pose.

In step S102, through the process of the pose measurement unit 101, the control device 100 receives and acquires an image from the cameras 20 of the motion capture system 200, and acquires the first measured pose obtained by measuring the marker 3*a* on the tool side and the second measured pose obtained by measuring the marker 4L on the hand 5L side in time-series according to the demonstration of the teacher U1. Then, the pose measurement unit 101 stores the first measured pose in the first measured pose storage unit 102 and stores the second measured pose in the second measured pose storage unit 103.

Next, in step S103, the teacher U1 inputs an operation instruction corresponding to the operation M1, for example, a gripping operation instruction, at the time of the operation M1. Through the processing of the operation instruction detection unit 104, the control device 100 detects the gripping operation instruction. The operation instruction detection unit 104 detects the gripping operation instruction input at the timing when the teacher U1 grips the test tube 7*a* with the left hand 5L. Accordingly, the control device 100 detects the operation M1 of gripping the test tube 7*a* as the operation object.

At this time, the teacher U1 uses the instruction input device 300 to input the gripping operation instruction at a timing in accordance with the operation M1. For example, when gripping the test tube 7*a* with the left hand 5L, the teacher U1 inputs the gripping operation instruction, for example, immediately after gripping the test tube 7 with the fingers 1101 as illustrated in FIG. 11. At the time of the gripping operation instruction, the teacher U1 uses the instruction input device 300 to input a signal by pressing, for example, a pressure-sensitive switch attached to a finger. Alternatively, the teacher U1 inputs the signal by pressing a foot switch under a foot. Alternatively, the teacher U1 inputs a predetermined voice representing the gripping operation M1, for example, "close" as a voice input through a microphone.

Any input voice of the operation instruction determined in advance is allowed, such as "grasp", "hold", or "get". Examples of a case of another operation, for example, a releasing operation, include "open" and "release". If a physical switch button is used, the operation instruction indicated by a signal of the switch button may be determined in advance. In addition, in a case where the order of various operations is determined in a time-series scenario or the like to be described later, the operation instruction indicated by the input signal can be determined by correspondingly determining the number or the order of the input signals in advance.

In step S104, the control device 100 checks whether the operation instruction of the predetermined operation is detected in step S103, and proceeds to step S105 if, for example, the operation instruction of the operation M1 is detected (Yes), and proceeds to step S107 if not detected (No).

In step S105, through the process of the teaching data generation unit 107, the control device 100 generates a time-series teaching pose by using the first measured pose and the second measured pose stored from the start of the work demonstration up to the current time point, and generates an operational motion command synchronized with the teaching pose at the latest time point. In other words, the teaching data generation unit 107 generates a time-series teaching pose associated with the operational motion command at the timing in accordance with the operation instruction, and stores the generated teaching pose in the teaching data storage unit 108. The operational motion command is, for example, a command representing the execution of a gripping motion by the hand mechanism 6L of the robot 2 in synchronization with the operation instruction of the left hand gripping operation M1, and is a teaching command for generating robotic motion data to be described later.

In step S106, through the processing of the teaching data generation unit 107, the control device 100 corrects the teaching pose up to the latest time point in reference to the correction data in the correction data storage unit 106, generates corrected teaching data, and stores the corrected teaching data in the teaching data storage unit 108. The correction will be described later.

In step S107, through the processing of the teaching instruction detection unit 105, the control device 100 checks whether the completion instruction is detected as the teaching instruction, proceeds to step S108 if the completion instruction is detected (Yes), and returns to step S102 and repeats the same if the completion instruction is not detected (No). At this time, the completion instruction may be, for example, a case where the worker U1 inputs a predetermined voice, for example, a voice such as "end" using the instruction input device 300, for example, through a microphone, and the teaching instruction detection unit 105 detects the completion instruction based on a signal of the voice.

In step S108, the control device 100 generates teaching data up to the corresponding latest time point when receiving the completion instruction based on the first measured pose and the second measured pose as the measured pose up to the latest time point, and stores the teaching data in the teaching data storage unit 108. At this time, the control device 100 additionally generates a time-series teaching pose up to the latest time point of receiving the completion instruction, which was not generated at the time point of step S108, and generates data on a teaching command indicating the end of the teaching data ("end") in association.

In step S109, the control device 100 corrects the teaching data as necessary, and ends the processing related to the teaching data.

In step S110, through the processing of the robotic motion generation unit 109, the control device 100 generates robotic motion data based on the teaching data on the teaching data storage unit 108, and stores the generated robotic motion data in the robotic motion data storage unit 110. The process of generating the robotic motion data from the teaching data may be executed automatically together with the generation of the teaching data, or may be executed at a later timing in response to an instruction input by the administrator U2 or the like.

For ease of understanding, the above flow has described a processing example focusing on the teaching of a certain operation M1, but is not limited thereto, and can also be implemented by carrying out similar processing for each operation when teaching a plurality of operations in a work demonstration. For example, if another gripping operation M2 continues after the gripping operation M1, the same processing may be applied to the operation M2. Alternatively, if a releasing operation of releasing the test tube 7*a* from the left hand 5L at a predetermined position continues after the gripping operation M1, the same processing may be applied to the releasing operation. Different correction data may be applied in accordance with a difference in the operation object and a difference in the operation of gripping or releasing.

[Teaching Data Calculation Part 1]

Calculation and correction of the teaching pose generated in the processes of steps S105 and S106 will be described with reference to FIG. 15A, etc. FIGS. 15A, 15B, and 15C illustrate the calculation and correction of the teaching pose according to Embodiment 1. As an example, FIG. 15A, etc. illustrate a graph representing a result of acquiring the first measured pose and the second measured pose by the pose measurement unit 101, a result of generating the teaching data by the teaching data generation unit 107, and the like at the time of teaching in the left hand gripping operation M1 in FIG. 12. In the graph, the horizontal axis represents the time point (t), and the vertical axis represents the positional coordinate in the X-axis direction, for example, as one direction in the coordinate system Σw of the work table 10. For ease of understanding, FIG. 15A, etc. illustrate the time-series data on only the position in the X-axis direction in the coordinate system Σw, but the information on the position in the Y-axis and the Z-axis are also included. In addition, although not illustrated, the information on the orientation of each axis representing the posture is also included. The sampling period of the time point is determined in advance.

FIG. 15A illustrates data D1, D2, D11, and D12. The data D1 is data on displacement on the X-axis as time-series data on the first measured pose on the tool side, that is, the measured pose of the marker 3*a* of the test tube 7*a*. The data D2 is data on displacement on the X-axis as time-series data on the second measured pose on the hand 5 side, that is, the measured pose of the marker 4L of the left hand 5L. The data D11 is time-series data on the pose in the coordinate system $\Sigma_{LT}$ in FIG. 10, which is calculated from the data D1 on the first measured pose corresponding to the pose in the coordinate system $\Sigma_{TLM}$ in FIG. 10. The data D12 is time-series data on the pose in the coordinate system $\Sigma_{LT}$ in FIG. 10, which is calculated from the data D2 on the second measured pose using the conversion $T_{LT}$ in FIG. 11. In other words, the data D11 is data converted from the data D1 into a pose at the gripping center position (origin $O_{LT}$). The data D12 is data converted from the data D2 into a pose at the gripping center position (origin $O_{LT}$).

FIG. 15B illustrates data D20 and D21. FIG. 15B also illustrates an example of the timing of the teaching instruction and the operation instruction described above, and illustrates data D30, D31, and D32 generated correspondingly. The data D20 is time-series data on the teaching pose, which calculated from the data D11 and D12 on the pose in the coordinate system $\Sigma_{LT}$ as the two left gripping portion coordinate systems in FIG. 15A, and is indicated by a solid line. Specifically, the data D20 is generated by selecting the data D12. The data D21 is time-series data obtained by correcting the data D20 on the teaching pose, and is indicated by a broken line. In the present example, the data D20 in the period from the time points t=0 up to m is corrected to the data D21.

The data D30 is data on the start instruction ("start") as the teaching instruction. The data D32 is data on the completion instruction ("end") as the teaching instruction. The data D31 is data on the gripping operation instruction ("close") as the operation instruction. The time point t=0 is a time point when the start instruction ("start") is input and detected. The time point t=m is a time point when the gripping operation instruction of the operation M1 ("close") is input and detected. The time point t=n is a time point when the completion instruction ("end") is input and detected. The left hand gripping operation M1 particularly corresponds to a motion near the time point t=m.

FIG. 15C illustrates data D40. The data D40 is time-series data based on the corrected data D21 in FIG. 15B, and is teaching data including data D41 and data D42. The data D41 is data on the teaching pose at the time point t=0 to m, and the data D42 is data on the teaching pose at time points t=m to n. The data D41 corresponds to the motion up to the operation M1, and the data D42 corresponds to the motion after the operation M1.

First, calculation of a basic teaching pose will be described. The time point for executing the teaching pose generation process in step S105 in FIG. 14 is set to the time point t=m in accordance with the timing of the gripping operation instruction ("close"). At this time, as illustrated in FIG. 15A, the control device 100 has measured the data D1 on the pose of the marker 3*a* on the tool side and the data D2 on the pose of the marker 4L on the hand side in time-series during the period from the time point 0 up to the time point m. In step S105, the control device 100 respectively converts the data D1 and the data D2 in the period up to the time point m into the data D11 and the data D12 as poses in the coordinate system $\Sigma_{LT}$ as the left gripping portion coordinate system as illustrated in FIG. 15A, based on the correlation illustrated in FIGS. 10 and 11.

In addition, in step S105, the control device 100 recognizes the motion teaching in the un-gripped state in the period up to the time point m based on that the gripping operation instruction ("close") is input at the time point m or that the data D1 (for example, the positional coordinate of the X-axis) is not changed in the period from the time point 0 up to the time point m.

Therefore, between the data D11 and D12, the control device 100 selects, as the teaching pose, the data D12 which is the measurement result of the pose on the hand side up to the gripping at the time point m, and generates the data D20 illustrated in FIG. 15B. The portion of the time points 0 to m in the data D20 in FIG. 15B is the same as the portion of the time points 0 to m of the data D12 in FIG. 15A.

[Teaching Pose Correction]

Next, teaching pose correction will be described. The data D11 on the tool side illustrated in FIG. 15A is obtained by directly measuring the pose of the test tube 7*a* itself, and thus represents a pose that allows the hand mechanism 6L of the robot 2 to grip with high accuracy at time point m. On the other hand, the data D12 on the hand side is generated by converting the pose of the marker 4L near the left wrist of the teacher U1. Therefore, the data D12 represents the trajectory of the left hand 5L up to the gripping operation at the time point m, in particular, the gripping operation instruction ("close"), but includes a large number of errors in the pose of gripping the test tube 7*a* with the left hand 5L at the time point m. The data D20 on the teaching pose generated by selecting the data D12 also has the same characteristics.

Such error caused by the motion of the hand of the worker U1 is illustrated as a difference ΔX related to the position of the X-axis in FIG. 15A, etc. as an example. The robot teaching device 1 and method according to Embodiment 1 generate suitable teaching data by correcting the teaching data in consideration of such errors. Therefore, in step S106, the control device 100 calculates a correction coefficient for performing correction such that the pose of the data D12 on the hand side at the time point m matches the pose of the data D11 on the tool side.

The control device 100 obtains the corrected teaching pose data D21 by correcting the data D20 corresponding to the data D12 illustrated in FIG. 15B using the correction coefficient in a form of tracing back from the gripping time point m to the past. In the present example, in this correction, the difference ΔX between the positions of the data D12 and the data D11 in the X-axis direction is used as the correction coefficient. The teaching data generation unit 107 generates the position of the corrected data D21 on the teaching pose by subtracting the difference ΔX from the position of the data D20 in a form of tracing back from the time point m to a past time point, in the present example, to t=0.

Then, the teaching data generation unit 107 generates the teaching data by combining the corrected data D21 on the teaching pose, the data D30 on the teaching instruction ("start") stored in synchronization with the time point, and the data D31 on the operation instruction ("close"). The generated teaching data corresponds to the data D41 as data D40 from the time point 0 up to the time point m illustrated in FIG. 15C.

Thereafter, the teaching data generation unit 107 stores the teaching data D41 at the time points 0 to m together with various related data used to generate the teaching data D41 in the teaching data storage unit 108 as the teaching data D40.

The range of past time points that can be traced back in the process of calculating the corrected data D21 on the teaching pose is restricted in advance based on a physical quantity such as the movement distance and the movement period, and is set and stored as a part of the correction data in the correction data storage unit 106. The control device 100 may perform the correction process described above using the correction data.

In this case, the teaching data generation unit 107 corrects the data D20 corresponding to the data D12 in the past in the form of tracing back to a certain time point i corresponding to one restriction in the correction data, that is, a time point of the boundary of the range, thereby generating the data D21 from the time point i up to the time point m as a part of the corrected data D41. For the portion before the time point i, the teaching data generation unit 107 selects the data D20 corresponding to the data D12, without correction, as a part of the corrected data D41.

Furthermore, in order to limit the change in the positions of the data D20 and the data D21 before and after the time point i reaching the restriction, the teaching data generation unit 107 may perform correction by applying the correction coefficient to the data D20 within the range of restriction while performing additional correction to match the pose of the data D20 or to minimize the change in the pose near the time point i reaching the restriction. A processing example using the above restriction or the like will be described later.

[Teaching Data Calculation Part 2]

In FIG. 15A, etc., the details of the teaching data generation starting from the time point m in steps S108 and S109 are as follows. As illustrated in FIG. 15A, the time point for executing the process of step S108 is assumed to be n. The control device 100 has measured the data D1 and the data D2 from the time point m up to the time point n in time-series. At this time, the control device 100 can recognize that the test tube 7*a* is moved with the left hand 5L gripping the test tube 7*a* as a work motion during the period from when the teacher U1 performs the operation M1 of gripping at the time point m up to the latest time point n, based on that the releasing operation instruction corresponding to the operation of releasing the test tube 7_a_ is not input or detected, that the data D11 as the measurement result of the pose of the test tube 7_a_ itself is changed, or the like during the period from the time points m to n.

Accordingly, during the period of the time points m to n, the control device 100 can trace the pose of the test tube 7_a_ handled by the teacher U1 in the demonstration with high accuracy by matching the gripping pose of the hand mechanism 6L of the robot 2 with the data D11 after converting the pose of the tool side. Therefore, in step S108, the teaching data generation unit 107 selects the data D11 in the period of the time points m to n to generates the data D11 as the data D20 on the teaching pose as the data D42 in FIG. 15C.

In the present example, in step S109, the teaching data is generated by combining the data D20 on the teaching pose and the data D32 on the teaching instruction ("end") stored with the time points synchronized, without correcting the teaching pose generated in step S108. The generated teaching data corresponds to the data D42 as the data D40 at the time points m to n in FIG. 15C. Thereafter, the teaching data generation unit 107 stores the teaching data D42 at the time points m to n together with various related data used to generate the teaching data D42 in the teaching data storage unit 108 as the teaching data D40.

The example in FIG. 15A, etc. mainly describes the correction of the position of the pose, but the correction can be similarly applied to the posture. For example, the control device 100 calculates a difference between the posture of the first measured pose on the tool side and the posture of the second measured pose on the hand side, and generates teaching data using this difference in posture.

In addition, the present example has described the case as illustrated in FIGS. 8 to 11 where the location for the hand 5 of the teacher U1 and the end effector 9 of the hand mechanism 6 to grip or otherwise operate the same tool (for example, the side surface of the upper portion of the test tube 7) is determined in advance. At the time of teaching, even if the location where the hand 5 of the teacher U1 operates the tool is deviated from the determined location, the deviation can be allowed by performing correction related to the error.

[Modifications]

FIG. 16A, etc. illustrate a modification related to the correction in consideration of the error in FIG. 15A, etc., and illustrate graphs similarly to FIG. 15A, etc., Assume that the measured pose obtained as the premise is the same as that in FIG. 15A. FIG. 16A illustrates Modification 1A as a certain modification. In Modification 1A, the control device 100 traces back from the time point m of the detection of the operation M1 to a time point i in the past in the range 1601 of the period determined according to the restriction, and corrects the data D20 corresponding to the data D12 to the data D21 in the range 1601. This correction is, for example, subtraction of the difference ΔX as described above. After the correction, the data D21 indicated by a broken line is obtained. The teaching data is obtained by connecting the data D20 before the time point i and the data D20 after the time point m to the data D21 in the range 1601 of the time points i to m. In the present example, the range 1601 corresponding to the restriction is the period from the time point m up to the time point i three time points before. The range 1601 corresponding to the restriction may be determined, for example, as a predetermined period in advance, or may be determined as a period in which a displacement corresponding to a threshold of distance occurs, where a distance in each axis such as the X-axis is determined as the threshold in advance. The range 1601 of restriction is more preferably determined depending on the structure of the operation object or the hand mechanism 6, or the like.

FIGS. 16B and 16C illustrate Modification 1B as another modification. In Modification 1B, the corrected data is further subjected to additional correction so as to be connected to the uncorrected data before and after in time-series as smoothly as possible, in other words, to minimize the change in the pose before and after in time-series as much as possible. In the present example, assume that data D20 different from that in the example in FIG. 16A is used, and the variation in the X-axis position is larger up to the time point m. First, similarly to Modification 1A in FIG. 16A, assume that the data D20 is corrected to the data D21 in the period of the time points i to m as the range 1601 corresponding to the restriction. This correction is, for example, subtraction of the difference ΔX. The portion after the correction of the first stage is indicated as data D21_a_. Next, the data D21_a_ is further subjected to correction of the second stage. The corrected portion is indicated as data D21_b_. In the correction of the second stage, the correction is performed such that the connection becomes smoother between the data D21_a_ and the data D20, that is, the change in position and/or posture of the pose is minimized, near the time point i as the boundary of the range 1601.

In the pose obtained by connecting the data D20 before and after to the data D21_a_, for example, the change in the position in the X-axis direction is large between the time point i and a time point j directly before the time point i. For example, the control device 100 calculates the change between time points, and performs the correction of the second stage if the change is equal to or greater than a threshold. For example, assume that the change between the time point j and the time point i is A1, and a change A1 is larger than the threshold. The control device 100 determines the correction range 1602 of the second stage based on, for example, the time point i as the boundary of the range 1601. The range 1602 is determined to include at least the period of the time points j to i corresponding to the change A1. In the illustrated example, the range 1602 is the period of the time points j to i. The control device 100 corrects the pose at each time point within the range 1602. Examples of this correction include statistical processing such as averaging.

FIG. 16C illustrates an example after the correction of the second stage as the data D21_b_. The white circle points are positions after correction. In the present example, the position at the time point j before correction and the position at the time point i are averaged, and the average value is taken as the position at the time point j and the position at the time point i after correction. Without being limited to such correction, the range 1602 may be wider, or other statistical processing may be adopted. In addition, the time-series data as the locus of the pose has been described as data obtained by connecting the position and the posture at each time point with a straight line, whereas the time-series data may be generated by connecting the position and the posture at each time point as a curve.

FIG. 17A illustrates Modification 1C as another modification. In Modification 1C, assume that, for example, the change A1 between the time point j and the time point i is equal to or greater than the threshold, for example, after being subjected to the first stage correction as in FIG. 16B. In this case, in Modification 1C, the data on the position at the time point j is regarded as noise, and is subjected to the correction of the second stage to match, for example, the position at the time point i. The corrected data is illustrated as data D21_c_.

FIG. 17B illustrates Modification 1D as another modification. In Modification 1D, assume that, for example, the change A1 between the time point j and the time point i is equal to or greater than the threshold, for example, after being subjected to the first stage correction as in FIG. 16B. In this case, in Modification 1D, the position of each time point is corrected so that the position of the time point j to the position of the time point m are connected with a straight line. The corrected data is illustrated as data D21*d* with a one-dot chain line.

As described above, in the methods of the modifications, the step of generating the teaching data includes a step of, if a change relative to data temporally before and after of data after being subjected to the correction for reducing the error in measurement data near the detected operation does not satisfy a predetermined value set in advance, additionally correcting a data portion desired to satisfy the predetermined value by statistical processing or noise removal. In addition, the data may be corrected by a method using known statistical processing or the like within a range in which the pose of the data D12 on the hand side can be matched with the pose of the data D11 on the tool side at the same time point as the data D31 on the operation instruction ("close") (the time point m of the operation instruction).

[GUI Screen]

FIG. 18 illustrates a display example of a screen including a GUI provided by the robot teaching device 1 according to Embodiment 1 to the worker U1 and the administrator U2 as users. The screen in FIG. 18 may be provided in a form of a web page, for example. The screen in FIG. 18 is displayed on the display screen of the display device of the input/output device 120 (the output device 1006 in FIG. 3) based on, for example, the processing by the teaching instruction detection unit 105 of the control device 100 in FIG. 2. The screen in FIG. 18 illustrates an example configured as a work scenario display screen. This screen enables setting and editing of a scenario of a work motion. This screen includes a scenario editing screen portion 1801 and a teaching data checking screen portion 1802.

On this screen, the worker U1 or the administrator U2 as the user can set the target work motion, necessary correction data and setting information, and the like, and can check such data and information, teaching data generated according to the work demonstration, and the like. In addition, the screen may allow the input of the above-described teaching instruction and the like, or another GUI screen may be provided for work such as the teaching instruction.

The scenario editing screen portion 1801 includes a GUI that displays the work scenario and allows the user to edit thereof. The work scenario is a scenario of the work motion as the target of work demonstration, and is divided into work units and can be associated with teaching data required for each work unit. In the illustrated example, the work scenario of the target work motion is configured as a sequential function chart having work units or steps such as "initial", "get test tube", and "move test tube". "Get test tube" illustrated in step S1810 is "motion/step of gripping the test tube" and corresponds to the above-described gripping operation M1 of the test tube 7. "Move test tube" illustrated in step S1811 is "motion/step of moving the test tube" and corresponds to the motion of moving the gripped test tube 7 after the gripping operation M1.

The user can set the type of work motion to teach by editing the work scenario on the scenario editing screen portion 1801. On this screen, the user can create a new work scenario, name and save a work scenario, and open or close a set work scenario. The control device 100 creates data and information such as the measurement data and the teaching data illustrated in FIG. 15A, etc. (for example, the data D41 and D42) in association with each motion/step of the work scenario according to the set work scenario.

In the present example, the work scenario of the scenario editing screen portion 1801 is described as a sequential function chart, but is not limited thereto as long as it can express the work scenario and transitions.

The teaching data checking screen portion 1802 includes a GUI that displays, in a checkable manner, the contents of the teaching data on the work motion generated in association with the work scenario and various data used for generating the teaching data. The GUI of the screen in FIG. 18 has a function of, when the user selects a work scenario or a motion/step (for example, step S1810) on the scenario editing screen portion 1801, displaying data corresponding to the selected step or the like, for example, the teaching data D40 in FIG. 15C or the various data used when generating the teaching data. In this screen, the user may select the measurement data, teaching data, and others to be displayed. In the present example, the various measurement data, teaching data, and the like are displayed on the teaching data checking screen portion 1802 in manner overlapped in the format of graph as in FIG. 15A, etc. In the present example, the value of the difference ΔX corresponding to the error described above is also displayed, so that the teaching data before and after the correction can be checked.

Although not illustrated, the data on the teaching instruction and the operation instruction described above can also be displayed on the teaching data checking screen portion 1802. In addition, if a threshold for determination or the like is used about the above-described correction in consideration of the error or the additional correction, setting information such as the threshold can also be displayed in the screen, so that the user can check or perform user setting on such setting information. In addition, a plurality of correction methods as shown in the above-described modifications may be implemented, in which case the user may select and set a correction method to be applied from the plurality of correction methods on the screen.

In the present example, the teaching data checking screen portion 1802 displays a graph of various data such as teaching data, but is not limited thereto as long as the contents of the data can be checked. For example, a data table of a database or the like may be displayed, commands or the like may be displayed, or the pose may be displayed three-dimensionally as in an example described later.

Effects, Etc. Of Embodiment 1

The robot teaching method and the like of Embodiment 1 allow even a person without knowledge on robots about techniques related to robot teaching to intuitively and efficiently teach a work motion a robot by a work demonstration while maintaining a normal human motion as much as possible, and can reduce the man-hours for pre-adjustment of teaching, facilitate the introduction, etc. Embodiment 1 can eliminate or minimize the change for teaching in the actual work motion that is normally performed by the worker, and allows teaching while maintaining the pose of the normal work motion. Therefore, even a person without knowledge on robots can easily and intuitively implement efficient teaching by work demonstration. In addition, Embodiment 1 does not require highly accurate recognition or image analysis related to the pose of the hand of the teacher and the pose of the tool, and can save the calculation resources, reduce the man-hours for pre-adjustment, and facilitate the introduction and implementation of a system related to robot teaching.

Embodiment 1 generates the teaching data including the correction related to the error by using the first marker on the tool side and the second marker on the hand side, and thus allows the teaching of a work motion involving a state in which the hand of the teacher U1 leaves the tool.

Various modifications of Embodiment 1 are possible. For example, the motion capture system 200 uses the cameras 20, but is not limited thereto, and may detect the position or the posture of the object using other measurement devices or sensors. For example, a gyro sensor, an acceleration sensor, or the like may be used, or an optical sensor supporting laser beam, infrared ray, or the like may be used. The operation object has been described with the tool as an example, but is not limited thereto, and may be a member or a product in a manufacturing process. The marker 3 on the hand side has been described with an example placed near the wrist on the forearm, but is not limited thereto, and may be placed in any location on the hand of the worker U1 that does not hinder the work motion.

In Embodiment 1, the pose of the hand is the pose of the markers 4 attached near the wrist on the forearm. As described above, the installation position and the detailed form of the markers are not limited thereto. In another example, if the markers are formed on the palm ahead of the wrist, the pose of the hand is obtained as the pose of the markers reflecting the movement of the palm.

As a modification, in the correction using the error as in FIG. 15B described above, the control device 100 may compare, for example, the calculated difference ΔX with a set threshold, execute the correction described above if the difference ΔX is equal to or greater than the threshold, and not execute the correction if smaller than the threshold.

Embodiment 2

A robot teaching method and device according to Embodiment 2 will be described with reference to FIG. 19 and the subsequent drawings. The basic configuration of Embodiment 2 and the like is the same as that of Embodiment 1. The following will mainly describe the components of Embodiment 2 and the like that are different from Embodiment 1.

Embodiment 2 is different from Embodiment 1 in that the teaching data is corrected in consideration of restriction when the robotic hand mechanism accesses the tool at the time of an operation such as gripping. This restriction is a restriction determined according to the correlation between the structure of the hand mechanism or the like and the structure such as the shape of the tool. More specifically, examples of the restriction include a restriction range related to the direction, position, distance, speed, force, or the like that allows the hand mechanism to move or operate when accessing the tool at the time of an operation such as gripping. The restriction range may be defined by a reference value, upper and lower limit values, or the like. Examples of the restriction include gripping only a specific location of the tool, approaching or leaving the tool from a specific direction within a certain distance range, and accessing at a certain speed or less within a certain range.

The correction in the teaching data generation in Embodiment 2 is to generate a teaching pose that enables an efficient motion of the mechanism of the robot so as to satisfy such a restriction, in other words, to prioritize the restriction. In the correction in Embodiment 2, the content of the restriction is set as correction data. During the teaching data generation, a part of the measured pose is corrected by replacement or the like with the correction data to generate the teaching data.

The restriction in Embodiment 2 is a concept different from the range of restriction tracing back to the past in Embodiment 1, and may be referred to as operation restriction, motion restriction, access restriction, etc. for distinguishment. The correction in consideration of the operation restriction in Embodiment 2 is a concept different from the correction in consideration of the error due to the motion of the hand in Embodiment 1. Embodiment 2 will be described as an example of a case having a function of performing correction related to the operation restriction in addition to the function of performing correction related to the error in Embodiment 1. Without being limited thereto, Embodiment 2 can be implemented with an example having only the function of performing correction related to the operation restriction without having the function of performing correction related to the error in Embodiment 1.

The configuration example of the control device 100 of the robot teaching device 1 according to Embodiment 2 is the same as that in FIG. 2, and the control device 100 mainly includes the operation pose generation unit 112. The operation pose generation unit 112 is, in other words, a teaching pose correction unit. In addition, in order to perform correction related to the operation restriction in Embodiment 2, correction data, that is, correction setting information is set and stored in the correction data storage unit 106 in FIG. 2. This setting of the correction data may be performed by the administrator U2 in advance, or the control device 100 may calculate the correction data. The correction data in Embodiment 2 additionally includes correction data related to the operation restriction in addition to the correction data in Embodiment 1.

The operation pose generation unit 112 generates an operation pose as a pose in consideration of the operation restriction using the correction data in the correction data storage unit 106. The operation pose generation unit 112 or the teaching data generation unit 107 corrects a part of the teaching data by replacing or correcting the part with the operation pose. The corrected teaching data is stored in the teaching data storage unit 108. The operation pose generation unit 112 in FIG. 2 may be regarded as a part of the teaching data generation unit 107.

[Work Demonstration]

An example of the work demonstration in Embodiment 2 will be described with reference to FIG. 12 described above. In the present example, as illustrated in FIG. 12, the teacher U1 performs an operation M2 of gripping the pipette 8 equipped with the marker 3*p* with the right hand 5R attached with the marker 4R. First, the pipette 8 is placed on the holder 81 on the work table 10. The teacher U1 moves the right hand 5R attached with the marker 4R to perform the operation M2 of gripping the pipette 8 on the holder 81, and moves the right hand 5R while gripping the pipette 8. Hereinafter, the teaching of the operation M2 will be described.

[Gripping of Pipette]

FIG. 19 is a perspective view illustrating a configuration example of the holder 81 on the work table 10, the state of the pipette 8 placed on the holder 81, the state of the marker 3*p* attached to the pipette 8 via the attachment 82, and the like. The pipette 8 and the marker 3*p* similar to those in FIG. 6 are placed on the holder 81.

In the present example, the structure of the holder 81 includes a flat plate 81*a* placed on the upper surface of the work table 10 and on the X-Y plane as a horizontal plane, a supporting pillar 81*b* standing on the flat plate 81*a* in the Z-axis direction as the vertical direction, and a support 81*c* provided at the upper end of the supporting pillar 81*b* in parallel with the X-Y plane. The support 81*c* has a shape with one of its four sides notched in the negative X-axis direction in the drawing so as to support the pipette 8 and the attachment 82 at a predetermined location. The long axis of the pipette 8 is arranged in the notched area of the support 81*c*.

The attachment 82 attached to the upper portion of the pipette 8 has a structure such as a shape that can be placed on the support 81*c* and can be gripped by the finger mechanisms 521 of the hand mechanism 6 (the finger mechanisms 521*a* and 521*b* in FIG. 8). When the pipette 8 is placed on the holder 81, the attachment 82 of the marker 3*p* is placed on the support 81*c* of the supporting pillar 81*b*, so that the holder 81 supports the load of the pipette 8, the attachment 82, and the marker 3*p*. The marker 3*p* connected to the attachment 82 is arranged, for example, on the X-Z plane at the same height position as the attachment 82 such that the rectangular flat plate protrudes outward from the support 81*c*. The marker 3*p* is also arranged in a manner without hindering the gripping operation.

To place and hold the pipette 8 on the holder 81, the pipette 8 is placed on the support 81*c* by moving the pipette 8 in a direction 1901 from negative to positive on the X-axis, for example, as a direction corresponding to the one notched side among the four sides of the XY plane of the support 81*c*. In contrast, to take out the pipette 8 from the holder 81, the pipette 8 is taken out from the support 81*c* by moving the pipette 8 in a direction 1902 from positive to negative on the X-axis, for example, as a direction corresponding to the one notched side among the four sides of the X-Y plane of the support 81*c*.

To grip and move the pipette 8 mounted on the holder 81 by the finger mechanisms 521 at the distal end of the hand mechanism 6R of the robot 2, it is essential that the mechanism can grip the upper portion of the test tube 8 on the holder 81, and the mechanism can move while maintaining an accessible position and posture so as not to collide with the holder 81. This is the above-described operation restriction.

In the present example, the attachment 82 and the like are designed in advance such that the right and left locations of the side surface of the attachment 82 can be gripped by the finger mechanisms 521 at the upper portion of the pipette 8. Different tools and mechanisms may accordingly have different locations of the operation and configuration of the attachment and different operation restrictions.

The operation by the hand portion 520 of the hand mechanism 6 of the robot 2 and the operation restriction related thereto are as follows as an example. At the time of gripping operation on the pipette 8, the hand mechanism 6 takes a posture of maintaining the finger mechanisms 521 in a horizontal posture, accesses the pipette 8 to move in parallel in the notched direction of the support 81*c*, that is, in the direction 1901 from the negative to the positive of the X-axis in the present example, as the trajectory of the position, and reaches a location on the side surface of the attachment 82 on the upper portion of the pipette 8 to grip the location from the left and right. Then, the hand mechanism 6 moves the finger mechanisms 521 in parallel in a manner pulling out in the direction 1902 from positive to negative on the X-axis while gripping the pipette 8 by the finger mechanisms 521 and maintaining the horizontal state.

[Operation Restriction and Operation Pose]

FIG. 20 illustrates a pose that allows the finger mechanisms 521 as the fingertips of the right hand mechanism 6R of the robot 2 (the finger mechanisms 521*a* and 521*b* in FIG. 8) to access the pipette 8 of the holder 81 in FIG. 19, and illustrates a side view of the X-Z plane in the coordinate system Σw. For ease of understanding, FIG. 20 only virtually illustrates the finger mechanisms 521 of the hand mechanism 6R by a broken line to illustrate the pose that allows the mechanism of the robot 2 to access the pipette 8. The attachment 82 and the marker 3*p* are not illustrated. In the following description, the coordinate system for representing the pose follows the coordinate system Σw as the work table coordinate system, similarly to Embodiment 1, unless otherwise specified.

FIG. 20 includes an operation restriction range R20. The operation restriction range R20 is a three-dimensional space range that requires operation restriction. The operation restriction range R20 is, for example, a range from a position X1 up to a position X2 in the X-axis direction, a range including the left and right relative to the position where the long axis of the pipette 8 is arranged (not illustrated) in the Y-axis direction, and a range above a height Z1 up to a predetermined height Z2 with the upper surface of the work table 10 as 0 in the Z-axis direction.

In FIG. 20, the trajectory of the pose, in other words, the path at the time of the access motion in the direction 1901 in FIG. 19 at the time of the gripping operation on the pipette 8 by the finger mechanisms 521 is indicated by a trajectory 2000. The trajectory of the motion of pulling out in the direction 1902 is a trajectory in a direction opposite to the trajectory 2000 of the motion in the direction 1901. The trajectory 2000 is formed by connecting a trajectory 2001 within the operation restriction range R20 and a trajectory 2002 outside the operation restriction range R20.

In the present example, for the hand mechanism 6R of the robot 2 to access the pipette 8 of the holder 81 and grip the pipette 8 without interfering with the holder 81, that is, without unnecessary contact or the like, the motion is performed in consideration of the operation restriction as follows. First, outside the operation restriction range R20, the hand mechanism 6R moves the finger mechanisms 521 to a position p21 corresponding to the boundary of the operation restriction range R20 in the trajectory 2002, which is basically free and allows a change in posture. The starting point of the trajectory 2002 is not particularly limited. The positions p21 and p22 are illustrated as the gripping center positions of the finger mechanisms 521. The position p21 corresponds to the position X2 in the X-axis direction, the position where the long axis of the pipette 8 is arranged in the Y-axis direction, and the position at the height Z1 from the upper surface of the work table 10 in the Z-axis direction.

Next, in the operation restriction range R20, the hand mechanism 6R maintains the horizontal posture and moves the finger mechanisms 521 in parallel at least by a distance Lf in the direction from negative to positive in the X-axis direction, toward the position p22 corresponding to the installation position and the gripping position of the pipette 8 of the holder 81 and the position of the height Z1 in the Z-axis. This motion is represented by the trajectory 2001 from the position X2 to the position X1. This can avoid interference between the finger mechanisms 521 and the holder 81. The hand mechanism 6R moves the finger mechanisms 521 in the Y-axis direction at the position p22 to grip the predetermined location on the upper side surface of the pipette 8 above the support 81*c*.

For the hand mechanism 6R to take out the pipette 8 from the holder 81 while gripping the pipette 8 without interfering with the holder 81, that is, without unnecessary contact or the like, the motion is performed in consideration of the operation restriction as follows. First, in the operation restriction range R20, the hand mechanism 6R maintains the horizontal posture and moves the finger mechanisms 521 gripping the pipette 8 in parallel at least by the distance Lf in the direction from positive to negative in the X-axis direction toward the position p22 corresponding to the installation position and the gripping position of the pipette 8 of the holder 81 and the position of the height Z1 in the Z-axis. This motion is a trajectory from the position X1 to the position X2 in a direction opposite to the trajectory 2001. This can avoid interference between the finger mechanisms 521 and the holder 81. Thereafter, the hand mechanism 6R basically freely moves the finger mechanisms 521 gripping the pipette 8 from the position p21 while allowing a change in posture. This motion is, for example, a trajectory in a direction opposite to the trajectory 2002, that is, a trajectory in the negative direction on the X-axis from the position X2. The end point of the trajectory is not particularly limited.

To perform teaching for implementing the motion of the hand mechanisms 6 of the robot 2 in consideration of such an operation restriction, in Embodiment 2, for example, the operation restriction range R20 or a pose corresponding thereto such as the trajectory 2001 is set in advance as the correction data related to the operation restriction. The control device 100 generates an operation pose corresponding to the operation restriction using such correction data for the measured pose on the right hand 5R side during the work demonstration of the teacher U1.

The pose corresponding to the trajectory 2001 within the operation restriction range R20 in the correction data is a pose determined uniquely depending on the gripping operation, the gripping object, the gripping mechanism, and the like. In the correction, such a pose is generated as the operation pose. This operation pose includes an approaching pose when the mechanism approaches the tool as in the trajectory 2001 and a leaving pose when the mechanism leaves the tool in the opposite trajectory.

A pose in which the mechanism and the tool do not interfere with each other, such as the trajectory 2001, is defined corresponding to the operation restriction range R20. The operation restriction range R20 includes, for example, the X-axis direction as a restricted displacement direction, the distance Lf as a restricted distance, and the horizontal posture as a restricted posture. The operation restriction range R20 includes: an approaching pose range, which is a range of the distance Lf in the positive direction on the X-axis in which the motion is to be performed in the approaching pose; a leaving pose range, which is a range of the distance Lf in the negative direction on the X-axis in which the motion is to be performed in the leaving pose; and the like.

The control device 100 sets at least one of the operation restriction range R20 and the pose of the trajectory as the correction data in the correction data storage unit 106. The control device 100 may calculate the pose of the trajectory based on the operation restriction range R20 set by the user on the screen and set the pose as correction data. The control device 100 may set the pose of the trajectory set by the user on the screen as the correction data.

In the present example, the trajectory 2001 when approaching and the trajectory when leaving at the time of the gripping operation are trajectories having the same posture but displacement in opposite directions, but is not limited thereto, and different trajectories and different operation restrictions may be set depending on the object.

[Correction in Consideration of Operation Restriction]

Next, teaching data generation including the correction in consideration of the operation restriction in the robot teaching method of Embodiment 2 will be described with reference to FIG. 21A, etc. FIGS. 21A, 21B, and 21C illustrate graphs for a detailed example of the teaching data generation in Embodiment 2, similarly to FIG. 15A, etc. FIG. 21A, etc. illustrate various data at the time of the right hand gripping operation M2 of gripping the pipette 8 of the holder 81 with the right hand 5R of the teacher U1 as illustrated in FIG. 12. For ease of understanding, FIG. 21A, etc. illustrate the time-series data on only the position in the X-axis direction of the coordinate system Σw similarly to the above. The period from the time point 0 up to the time point m corresponds to the motion of the right hand 5R moving to and gripping the pipette 8. The gripping operation instruction is input and detected corresponding to the operation M2 at the time point m.

FIG. 21A illustrates data D1' on the first measured pose of the marker 3*p* on the pipette 8 side, data D2' on the second measured pose of the marker 4R on the right hand 5R side of the worker U1, data D11' obtained by converting the data D1' into a pose at the gripping center position, and data D12' obtained by coordinate conversion from the data D2' into a pose at the gripping center position.

FIG. 21B illustrates data D20', data D21', and data D200. The data D20' is a teaching pose generated by selecting the data D12' based on the data D11' and the data D12', similarly to the data D20 in FIG. 15. The data D21' is a teaching pose generated by correcting the data D20'. The correction from the data D20' to the data D21' is correction using subtraction of the difference ΔX in the period of the time points 0 to m in consideration of the error of the movement of the hand as in Embodiment 1. FIG. 21B includes data D30' on a teaching instruction at the time point 0 (“start”), data D31' on an operation instruction at the time point m (“close”), and data D32' on a teaching instruction at the time point n (“end”).

In FIG. 21B, a range 2101 indicates a range of positions corresponding to the distance Lf in the X-axis direction in the approaching pose range of the operation restriction range R20 in FIG. 20. A position Xr1 corresponds to the position X2 in FIG. 20, and a position Xr2 corresponds to the position X1. In addition, the time points at which the positions in the X-axis direction in the data D21' and the data D20' fall within the range 2101 corresponding to the approaching pose range of the distance Lf of the operation restriction range R20 in FIG. 20 are indicated as time points Tra to Trb. The time point Tra corresponds to a time point when the position in the data D21' exceeds the position Xr1, and the time point Trb corresponds to a time point when the position in the data D20' falls below the position Xr1. The position in the data D21' reaches the vertex position Xr2 at the time point m, and is connected to the position of the uncorrected data D20' starting from the time point m.

After calculating the teaching pose such as the data D21', through the process of the operation pose generation unit 112 in FIG. 2, the teaching data generation unit 107 refers to the correction data stored in the correction data storage unit 106 to generate the operation pose corresponding to the operation restriction range R20. The operation pose generation unit 112 generates an approaching pose corresponding to the operation restriction range R20, such as the trajectory 2001. Then, the teaching data generation unit 107 performs correction related to the operation restriction using this operation pose.

In FIG. 21B, the approaching pose is represented by data Da on a straight line from a time point ta up to the time point m. The operation pose generation unit 112 calculates the data Da on the approaching pose so as to match the position Xr2 and the posture of the same pose as the data D11' and the data D21' at the time point m of the gripping operation M2. Accordingly, the start time point ta of the data Da on the approaching pose is also calculated. Then, the teaching data generation unit 107 replaces a part of the data D21' corresponding to the time points ta to m with the approaching pose.

The data Db on the leaving pose after the time point m of the gripping operation M2 can be similarly calculated. The operation pose generation unit 112 generates a leaving pose corresponding to the operation restriction range R20 in FIG. 20, such as the trajectory opposite to the trajectory 2001. In FIG. 21, the leaving pose is represented by data Db on a straight line from the time point m up to a time point tb. The operation pose generation unit 112 calculates the data Db on the leaving pose so as to match the position Xr2 and the posture of the same pose as the data D11' and the data D21' at the time point m of the gripping operation M2. Accordingly, the end time point tb of the data Da on the leaving pose is also calculated. Then, the teaching data generation unit 107 replaces a part of the data D20' corresponding to the time points m to tb with the leaving pose.

The data D200 (Da, Db) corrected by the replacement using the approaching pose and the leaving pose as the operation pose is a part of data D40' in FIG. 21C. The data D40' includes data D41' including the data Da on the approaching pose up to the time point m and data D42' including the data Db on the leaving pose from the time point m onwards, and is also associated with the above-described data (D30', D31', D32') on the teaching instruction and the operation instruction. In the data D41' up to the time point m, the data before correction from the time point Tra up to the time point ta is corrected to data Dc that remains as at the position Xr1 without changing. In the data D42' from the time point m onwards, the data before correction from the time point tb up to the time point Trb is corrected to the data Dd that remains as at the position Xr1 without changing.

As described above, in Embodiment 2, data D21' and data D20 on the teaching pose are first generated in the same manner as in Embodiment 1, the data Da and Db on the operation pose in consideration of the operation restriction range R20 are further generated, and correction is performed such that the range of the time points Tra to Trb near the time point m of the gripping operation as a part of the data D21' and the data D20 on the teaching pose is replaced by the operation pose. Thus, the teaching data D40' including the corrected data D200 is obtained.

[Modifications]

As a modification of Embodiment 2, a further detailed processing example related to the correction in consideration of the operation restriction will be described. In the processing example of the correction in FIG. 21A, etc., as for the data D200 (Da, Db) on the operation pose, both the approaching pose and the leaving pose are generated as a straight line with a constant slope, in other words, a pose displaced at a constant speed. These poses are directly used for replacement. The start time point ta and the end time point tb of the operation pose are determined depending on the slope of the straight line at that time. The periods before and after are corrected as un-displaced straight lines as in the data Dc and Dd. The slope and speed of the straight line are also determined depending on the operation restriction. Without being limited to such a correction processing example, various processing examples are possible.

FIG. 22A illustrates Modification 2A as a certain modification. The measurement data and the like as the premise are the same as those in FIG. 21A. In Modification 2A, based on the time point Tra and time point Trb corresponding to the distance Lf of the operation restriction range R20 with the position of the gripping operation at the time point m as the vertex, the operation pose generation unit 112 generates the data Da' on the approaching pose as a straight line connecting the time point Tra and the time point m, and generates the data Db' on the leaving pose as a straight line connecting the time point m and the time point Trb. The data Da' and the data Db' have a slope gentler than the data Da and the data Db described above. Then, the data D21' and the data D20' on the teaching pose are replaced with the operation pose D200*a* (Da', Db'), thereby generating the corrected teaching data as illustrated.

FIG. 22B illustrates Modification 2B as another modification. Assume that the measurement data and the like to be assumed have larger changes and fluctuations than those in FIG. 21A. In addition, in the present example, the vertex position at the time of the gripping operation continues from the time point m up to the time point m'. That is, the teacher U1 keeps gripping the pipette 8 with the right hand 5R during the operation M2 for a certain period. Further, in the present example, the time point tb is a time point later than the time point Trb because the displacement at the time of leaving is larger.

The data D21' and the data D20' are teaching poses before correction. The operation pose generation unit 112 generates the operation pose D200*b* (Da, Db) for the data D21' and the data D20' similarly as the processing example in FIG. 21A, etc. of Embodiment 2. The operation pose D200*b* includes the data Da on the approaching pose from the time point ta up to the time point m and the data Db on the leaving pose from the time point m' up to the time point tb. In Modification 2B, the pose before and after the data D200*b* on the operation pose are maintained as the pose of the original data D21' and data D20' without being corrected if possible. In the present example, the time period from the time point Tra up to the time point ta includes, as an of example the original data D21', data De connecting a position Xr4 at a time point tc and the position Xr1 at the time point ta. The period near the time point Trb is corrected to prioritize the data Db up to the time point tb, and is connected to the position of the data D20' after the time point tb.

The correction as in Modification 2B is possible. The following correction, however, may be further performed if concerned about a portion in which the change in pose is large, for example, a portion including the position Xr4 at a time point tc.

FIG. 22C illustrates Modification 2C as another modification. In Modification 2C, for example, after performing the correction by the operation pose in consideration of the operation restriction as in FIG. 22B, additional correction is performed such that the connection becomes smoother between the portion replaced with the operation pose and the part of the periods before and after, in other words, the change in pose is minimized. The concept of this correction is the same as the correction in the modifications of Embodiment 1, and various processing examples can be applied similarly.

In the example in FIG. 22C, assume that, for example, the displacement A4 in the X-axis direction is larger than the threshold between the time point tc and the time point ta. In this case, the teaching data generation unit 107 corrects the teaching pose to reduce the displacement A4 by a method such as statistical processing or noise removal. In an example of the case of using statistical processing, for example, the position Xr4 at the time point tc and the position Xr1 at the time point ta are averaged, and the position at the time point tc at which the change is large is corrected, for example, replaced by the average value. The corrected teaching pose in this case is data Df. In another example, the position Xr1 at the time point ta may also be replaced with this average value to obtain a gentle slope of the straight line of the data Da. In an example in which noise removal is used, the position at the time point tc at which the change is large is regarded as noise, and is corrected to a straight line without displacement so as to be the same as the position Xr1 at the time point Tra and the time point ta. The corrected teaching pose in this case is data Dg.

For the motion of leaving from the time point m onwards, the above-described various processing examples of correction can be applied similarly.

As another modification, correction may be performed so as to shorten the period maintained at the vertex position such as the time points m to m' without being displaced to 0 or within a predetermined period. The period of the vertex may be determined as a part of the correction data, so that the correction is performed to reach the period.

[GUI Screen]

FIG. 23 illustrates a display example of a screen including a GUI provided by the robot teaching device 1 to the worker U1 and the administrator U2 as users in Embodiment 2. The screen in FIG. 23 is displayed on the display screen of the display device of the input/output device 120 (the output device 1006 in FIG. 3) based on, for example, the processing by the teaching instruction detection unit 105 of the control device 100 in FIG. 2. The screen of FIG. 23 illustrates an example configured as a work space editing screen. This screen enables setting and editing of a work space. This screen includes a work table setting screen portion 2301, a correction data setting screen portion 2302, and a correction data editing screen portion 2303.

The processing in the robot teaching method according to Embodiment 2 can be executed by the user setting the correction data in the control device 100 in advance using the work space editing screen in FIG. 23. The worker U1 or the administrator U2 as the user can set the work space, necessary correction data, and the like on the screen in FIG. 23, and can check such data and information. The work space corresponds to the space on the work table 10 as illustrated in FIG. 1, and can also be set with the coordinate system Σw. The user can set, name and save each work space on the screen in FIG. 23, and can read and check saved setting.

The work table setting screen portion 2301 has a GUI for determining the type and arrangement of an object placed on the work table 10 as illustrated in FIG. 1. The object is a tool as the operation object, or an object related to the tool such as a holder. In the present example, the holder 71 for the test tube 7, the holder 81 for the pipette 8, and the like are displayed on the work table setting screen portion 2301 in the perspective view of the work table 10. The user can set the position, posture, and the like of the object while changing the view of the work table 10 by operating, for example, a cursor of a mouse. Further, the position and the orientation of the cameras 20 as illustrated in FIG. 4 may be set on the work table setting screen portion 2301.

The correction data setting screen portion 2302 includes a GUI for setting the trajectory of an operation pose such as an approaching pose or a leaving pose as illustrated in FIG. 20 described above, and the correction data such as the operation restriction range R20, for an object including an operation object that can be set on the work table setting screen portion 1301 (for example, FIG. 19). In the present example, a side view of the coordinate system Σw in the X-Z plane is displayed in a lower area 2302*b* of the correction data setting screen portion 2302, for example, similarly to FIG. 20. In the correction data setting screen portion 2302, it is possible to set and check a file on the name and view of the setting of the object and the like, the distance and force of the restriction on each axis of the coordinate system Σw in the operation restriction range R20, the trajectory of the operation pose, and the like. The trajectory of the operation pose may be set by the user operating the cursor of the mouse or the like in the area 2302*b* or the correction data editing screen portion 2303, for example. The trajectory of the set operation pose may be displayed and checked in the area 2302*b* or the correction data editing screen portion 2303. The initial position of the hand 5 or the hand mechanism 6 of the teacher U1, in other words, the initial position of the trajectory of the pose may be set on the correction data setting screen portion 2302.

The correction data editing screen portion 2303 has a GUI that enables the details of the correction data that can be set in the correction data setting screen portion 2302 to be checked and edited as a motion such as a pose of the distal end of the hand mechanism 6 of the target robot 2, for example, the finger mechanisms 521 of the hand portion 520 in FIG. 8. In the present example, the correction data editing screen portion 2303 displays, as animation or the like, the motion of gripping or leaving the pipette 8 by the finger mechanisms 521 of the hand portion 520 of the right hand mechanism 6R in correspondence with the range R20 and the trajectory of the operation pose set in the correction data setting screen portion 2302. The motion can also be displayed as a still image by designating time-series time points.

Although not illustrated, the target mechanism may be set on the screen if there are a plurality of hand mechanisms of the candidate robots 2. Although not illustrated, the contents of the teaching data generated by the system according to Embodiment 2 can be checked by being displayed on a screen similar to that illustrated in FIG. 18, for example.

Although not illustrated, if a threshold for determination or the like is used about the above-described correction in consideration of the operation restriction or the additional correction, setting information such as the threshold can also be displayed in the screen, so that the user can check or perform user setting on such setting information. In this case, a plurality of correction methods may be implemented as in the modifications described above. In that case, the user may be allowed to select and set the correction method to be applied from the plurality of correction methods on the screen.

Effects, Etc. Of Embodiment 2

As described above, according to Embodiment 2, the following is achieved in addition to the effects of Embodiment 1. In Embodiment 2, if different hand poses may be taken during a work motion of the human teacher U1 and during a work motion of the robot 2 depending on the shape of the gripping mechanism of the robot 2 or the shape of the gripping object, it is possible to more easily generate an appropriate teaching pose by performing correction in consideration of the operation restriction from the demonstration of the normal work motion.

Embodiments of the present disclosure has been specifically described above, but are not limited to the above-described embodiments, and various modifications can be made without departing from the scope of the invention. In each embodiment, components can be added, deleted, replaced, or the like except for essential components. Unless otherwise specified, each component may be single or plural. The embodiments and the modifications can be combined.

APPENDIX

The robot teaching method according to the embodiment may be as follows. A robot teaching method according to an embodiment includes a step of calculating a teaching pose expressed by a work table coordinate system by coordinate conversion based on a correlation among a work table coordinate system, a coordinate system of a pose of a first marker placed on an operation object, a coordinate system of a pose of a second marker placed on a hand of a teacher, and a coordinate system of a robotic hand mechanism.

REFERENCE SIGNS LIST

1: robot teaching device (robot teaching system)
2: robot
3 (3*a*, 3*b*, 3*p*): marker (marker plate, hand-side marker, first marker)
4 (4L, 4R): marker (marker plate, tool-side marker, second marker)
5 (5L, 5R): hand
6 (6L, 6R): hand mechanism
7 (7*a*, 7*b*): test tube (first tool)
8: pipette (second tool, micropipette)
U1: teacher (worker, first user)
U2: administrator (second user)
9: end effector
10: work table
20 (20*a*, 20*b*, 20*c*, 20*d*): camera
100: control device (robot teaching control device)
D1, D2, D11, D12, D20, D21, D30, D31, D32, D40, D41, D42: data

The invention claimed is:

1. A robot teaching method for performing teaching for generating robotic motion data based on measurement of a work motion including an operation on an operation object by a hand of a teacher, the robotic motion data including a sequence of joint displacement as a motion of a robotic hand mechanism of a robot corresponding to the work motion, the robot teaching method comprising, as steps performed by a computer system:

a step of acquiring a first measured pose obtained by measuring a time-series pose including a position and a posture of the operation object during the work motion;

a step of acquiring a second measured pose obtained by measuring a time-series pose including a position and a posture of the hand of the teacher during the work motion;

a step of detecting the operation on the operation object by the teacher; and a step of generating a teaching pose for generating the robotic motion data based on the first measured pose, the second measured pose, and the detected operation; and a step of controlling the motion of the robot based on the robotic motion data generated by the teaching pose;

wherein the step of generating the teaching pose includes a step of acquiring, as set correction data, correction data representing an operation restriction related to an operation pose when the robotic hand mechanism performs the operation on the operation object;

wherein the teaching pose is generated by using the correction data to correct measurement data near the operation in the first measured pose and the second measured pose so as to satisfy the operation restriction; and wherein the step of performing correction to satisfy the operation restriction includes a step of acquiring a time point reaching a boundary of a range of the operation restriction in the first measured pose and the second measured pose is reached, and a step of additionally correcting, by statistical processing or noise removal, a portion of measurement data temporally before and after a corrected portion of the measurement data including the operation pose.

2. The robot teaching method according to claim 1, wherein the step of generating the teaching pose includes a step of acquiring difference data as an error of the second measured pose by the hand relative to the first measured pose of the operation object, and wherein the teaching pose is generated by using the difference data to correct measurement data near the operation in the first measured pose and the second measured pose so as to reduce the error.

3. The robot teaching method according to claim 2, wherein the step of generating the teaching data includes a step of acquiring the difference data at a time point corresponding to a timing of the detected operation, and a step of performing correction for reducing the error within a time range by tracing back to a past time point within the time range from the time point corresponding to the timing of the detected operation, the time range being determined in accordance with a set physical quantity.

4. The robot teaching method according to claim 3, wherein the step of performing correction for reducing the error within the time range is a step of correcting measurement data before the correction within the time range by statistical processing or noise removal.

5. The robot teaching method according to claim 2, wherein the step of generating the teaching data includes a step of, if a change relative to data temporally before and after of data after being subjected to the correction for reducing the error in measurement data near the detected operation does not satisfy a predetermined value set in advance, additionally correcting a data portion desired to satisfy the predetermined value by statistical processing or noise removal.

6. The robot teaching method according to claim 1, wherein the step of acquiring the first measured pose is a step of measuring a time-series pose including a position and a posture of a first marker placed on the operation object, the step of acquiring the second measured pose is a step of measuring a time-series pose including a position and a posture of a second marker placed on the hand of the teacher, the first marker and the second marker are marker plates each having an arrangement pattern based on a plurality of reflective markers unique to the marker, and the first marker and the second marker are measured by a camera.

7. The robot teaching method according to claim 1, wherein the step of detecting the operation on the operation object by the teacher is a step of detecting an operation instruction representing the operation input by the teacher using an instruction input device, or a step of detecting the operation by automatically determining the operation based on the first measured pose and the second measured pose.

8. The robot teaching method according to claim 1, wherein the operation restriction is determined according to a structure of the operation object and a structure of the robotic hand mechanism for operating the operation object, and includes a restriction range related to a direction and a distance of movement of the hand mechanism on each axis of a space coordinate system near the operation object.

9. The robot teaching method according to claim 1, wherein the operation restriction includes a restriction range related to at least one operation pose between a pose when the robotic hand mechanism approaches the operation object on a work table to perform the operation and a pose when the robotic hand mechanism leaves the operation object on the work table after performing the operation.

10. The robot teaching method according to claim 1, wherein the step of performing correction to satisfy the operation restriction includes a step of replacing a part of the measurement data near the operation in the first measured pose and the second measured pose with the operation pose.

11. The robot teaching method according to claim 1, wherein the step of performing correction to satisfy the operation restriction includes a step of acquiring a time point reaching a boundary of a range of the operation restriction in the first measured pose and the second measured pose, and a step of using the operation pose to perform correction such that measurement data at a time point corresponding to a timing at which the operation in the first measured pose and the second measured pose is detected and measurement data at the time point at the boundary of the range of the operation restriction are connected to each other.

12. The robot teaching method according to claim 6, wherein the first marker includes a first attachment for attaching the first marker to the operation object to maintain a pose correlation with the operation object, the second marker includes a second attachment for attaching the second marker to the hand to maintain a pose correlation with the hand of the teacher, and the operation on the operation object by the robotic hand mechanism is an operation on a location of the first attachment.

13. A robot teaching device for performing teaching for generating robotic motion data based on measurement of a work motion including an operation on an operation object by a hand of a teacher, the robotic motion data including a sequence of joint displacement as a motion of a robotic hand mechanism of a robot corresponding to the work motion, the robot teaching device comprising a computer system, wherein the computer system is configured to:

acquire a first measured pose obtained by measuring a time-series pose including a position and a posture of the operation object during the work motion;

acquire a second measured pose obtained by measuring a time-series pose including a position and a posture of the hand of the teacher during the work motion;

detect the operation on the operation object by the teacher;

generate a teaching pose for generating the robotic motion data based on the first measured pose, the second measured pose, and the detected operation; and control the motion of the robot based on the robotic motion data generated by the teaching pose;

wherein generating the teaching pose includes acquiring, as set correction data, correction data representing an operation restriction related to an operation pose when the robotic hand mechanism performs the operation on the operation object;

wherein the teaching pose is generated by using the correction data to correct measurement data near the operation in the first measured pose and the second measured pose so as to satisfy the operation restriction; and wherein correction to satisfy the operation restriction includes acquiring a time point reaching a boundary of a range of the operation restriction in the first measured pose and the second measured pose is reached, and correcting, by statistical processing or noise removal, a portion of measurement data temporally before and after a corrected portion of the measurement data including the operation.

* * * * *